United States Patent
Dallesasse et al.

(10) Patent No.: US 9,170,373 B2
(45) Date of Patent: Oct. 27, 2015

(54) SYSTEMS AND METHODS FOR PHOTONIC POLARIZATION-SEPARATING APPARATUSES FOR OPTICAL NETWORK APPLICATIONS

(75) Inventors: John Dallesasse, Geneva, IL (US); Stephen B. Krasulick, Albuquerque, NM (US)

(73) Assignee: Skorpios Technologies, Inc., Albuquerque, NM (US)

( * ) Notice: Subject to any disclaimer, the term of this patent is extended or adjusted under 35 U.S.C. 154(b) by 194 days.

(21) Appl. No.: 13/491,395

(22) Filed: Jun. 7, 2012

(65) Prior Publication Data

US 2013/0142476 A1    Jun. 6, 2013

Related U.S. Application Data

(60) Provisional application No. 61/494,871, filed on Jun. 8, 2011.

(51) Int. Cl.
| | |
|---|---|
| *G02B 6/10* | (2006.01) |
| *G02B 6/26* | (2006.01) |
| *G02B 5/30* | (2006.01) |
| *G02B 6/126* | (2006.01) |

(52) U.S. Cl.
CPC ............... *G02B 6/26* (2013.01); *G02B 5/3058* (2013.01); *G02B 6/105* (2013.01); *G02B 6/126* (2013.01)

(58) Field of Classification Search
CPC ................. G02F 1/0353; G02F 2001/212
USPC ................................................. 385/6, 11, 14
See application file for complete search history.

(56) References Cited

U.S. PATENT DOCUMENTS

| | | | | |
|---|---|---|---|---|
| 6,101,026 A | * | 8/2000 | Baney ...................... | 359/341.41 |
| 7,269,317 B2 | * | 9/2007 | Blauvelt et al. .................. | 385/50 |
| 7,995,893 B2 | * | 8/2011 | Bi et al. ......................... | 385/131 |
| 8,150,219 B2 | * | 4/2012 | Nasu et al. ...................... | 385/11 |
| 8,849,072 B2 | * | 9/2014 | Montoya et al. .................. | 385/6 |
| 2002/0181067 A1 | * | 12/2002 | Romanovsky et al. ........ | 359/245 |
| 2004/0114872 A1 | * | 6/2004 | Nagai .............................. | 385/50 |
| 2004/0218870 A1 | * | 11/2004 | Blauvelt et al. .................. | 385/50 |
| 2005/0078913 A1 | * | 4/2005 | Blauvelt et al. .................. | 385/39 |
| 2006/0018584 A1 | | 1/2006 | Watts et al. | |
| 2006/0097816 A1 | | 5/2006 | Nagai | |
| 2006/0165373 A1 | * | 7/2006 | Blauvelt et al. ............... | 385/147 |
| 2007/0237450 A1 | * | 10/2007 | Blauvelt et al. .................. | 385/14 |
| 2007/0237456 A1 | * | 10/2007 | Blauvelt et al. .................. | 385/34 |

(Continued)

FOREIGN PATENT DOCUMENTS

WO     2010137752 A1    12/2010

*Primary Examiner* — Kaveh Kianni
(74) *Attorney, Agent, or Firm* — Kilpatrick Townsend & Stockton LLP

(57) ABSTRACT

An integrated photonic polarization-separating apparatus includes a first waveguide polarization beam splitter (PBS) having a first port, a second port, a third port, and a fourth port and a first polarization rotator optically coupled to the first port of the first waveguide PBS. The apparatus also includes a first Faraday rotator optically coupled to the first polarization rotator and a second polarization rotator optically coupled to the second port of the first waveguide PBS. The apparatus further includes a second Faraday rotator optically coupled to the second polarization rotator and a second waveguide PBS having a first port, a second port, a third port, and a fourth port. The third port is optically coupled to the first Faraday rotator and the fourth port is optically coupled to the second Faraday rotator.

12 Claims, 13 Drawing Sheets

(56) References Cited

U.S. PATENT DOCUMENTS

| | | |
|---|---|---|
| 2007/0253661 A1 | 11/2007 | Black et al. |
| 2008/0019637 A1* | 1/2008 | Little et al. .................. 385/28 |
| 2008/0031572 A1* | 2/2008 | Blauvelt et al. ............. 385/33 |
| 2009/0110344 A1 | 4/2009 | Little et al. |
| 2009/0136191 A1* | 5/2009 | Bi et al. ..................... 385/131 |
| 2010/0002989 A1 | 1/2010 | Tokushima |
| 2010/0104237 A1* | 4/2010 | Nasu et al. .................. 385/11 |
| 2010/0316327 A1* | 12/2010 | Montoya et al. .............. 385/6 |
| 2011/0150384 A1 | 6/2011 | Nagarajan et al. |
| 2011/0293275 A1* | 12/2011 | Evans et al. ................. 398/65 |
| 2012/0121216 A1 | 5/2012 | Oh |
| 2013/0142474 A1 | 6/2013 | Dallesasse et al. |
| 2013/0142475 A1 | 6/2013 | Dallesasse et al. |
| 2013/0142476 A1 | 6/2013 | Dallesasse et al. |

* cited by examiner

SYSTEMS AND METHODS FOR PHOTONIC POLARIZATION-SEPARATING APPARATUSES FOR OPTICAL NETWORK APPLICATIONS

CROSS-REFERENCES TO RELATED APPLICATIONS

This application claims the benefit under 35 U.S.C. §119 (e) of U.S. Provisional Patent Application No. 61/494,871, filed on Jun. 8, 2011, entitled "Method and System for Silicon Photonic Polarization Control," the disclosure of which is hereby incorporated by reference in its entirety for all purposes.

The following three U.S. patent applications (including the present application) are being filed concurrently, and the entire disclosure of the other applications are incorporated by reference into this application for all purposes:

application Ser. No. 13/491,360, filed Jun. 7, 2012, entitled "SYSTEMS AND METHODS FOR PHOTONIC POLARIZATION BEAM SPLITTERS";

application Ser. No. 13/491,389, filed Jun. 7, 2012, entitled "SYSTEMS AND METHODS FOR PHOTONIC POLARIZATION ROTATORS"; and application Ser. No. 13/491,395, filed Jun. 7, 2012, entitled "SYSTEMS AND METHODS FOR PHOTONIC POLARIZATION-SEPARATING APPARATUSES FOR NETWORK APPLICATIONS".

BACKGROUND OF THE INVENTION

Advanced electronic functions such as photonic device bias control, modulation, amplification, data serialization and de-serialization, framing, routing, and other functions are typically deployed on silicon integrated circuits. A key reason for this is the presence of a global infrastructure for the design and fabrication of silicon integrated circuits that enables the production of devices having very advanced functions and performance at market-enabling costs. Silicon has not been useful for light emission or optical amplification due to its indirect energy bandgap. This deficiency has prevented the fabrication of monolithically integrated optoelectronic integrated circuits on silicon.

Compound semiconductors such as indium phosphide, gallium arsenide, and related ternary and quaternary materials have been extremely important for optical communications, and in particular light emitting devices and photodiodes because of their direct energy bandgap. At the same time, integration of advanced electrical functions on these materials has been limited to niche, high-performance applications due to the much higher cost of fabricating devices and circuits in these materials.

Thus, there is a need in the art for improved methods and systems related to hybrid integration of silicon and compound semiconductor devices.

SUMMARY OF THE INVENTION

The present invention relates generally to optoelectronic devices. More specifically, the present invention relates to methods and systems for polarization control in optical systems. Merely by way of example, the invention has been applied to methods and systems for rotating optical polarization, splitting optical beams including multiple polarization components, and optical network units. The methods and techniques can be applied to a variety of optoelectronic systems including integrated optoelectronics, hybrid systems, communications components, and the like.

According to an embodiment of the present invention, an integrated photonic polarization beam splitter is provided. The integrated photonic polarization beam splitter includes an optical coupler having an input port, a first output port, and a second output port. The optical coupler is operable to couple a portion of an input light beam at the input port into the first output port and another portion of the input light beam into the second output port. The integrated photonic polarization beam splitter also includes a first waveguide having a first linear polarizer embedded therein and coupled to the first output port of the optical coupler and a second waveguide having a second linear polarizer embedded therein and coupled to the second output port of the optical coupler.

According to another embodiment of the present invention, an integrated photonic polarization beam splitter is provided. The integrated photonic polarization beam splitter includes at least one reflector disposed at a Brewster's angle and operable to reflect a portion of an input light beam and transmit another portion of the input light beam. The portion of the input light beam reflected by the at least one reflector is polarized substantially in a first direction and the another portion of the input light beam transmitted by the at least one reflector is polarized substantially in a second direction substantially perpendicular to the first direction. The integrated photonic polarization beam splitter also includes an optical coupler having at least one input port and an output port and at least one waveguide segment operable to couple the portion of the input light beam reflected by the at least one reflector into the at least one input port of the optical coupler.

According to a specific embodiment of the present invention, a waveguide polarization rotator is provided. The waveguide polarization rotator includes a substrate having a surface and a waveguide coupled to the surface of the substrate and operable to support a light beam along a direction of beam propagation. The waveguide includes a slab having a support surface and a second surface opposing the support surface and a rib protruding from the second surface of the slab in a direction substantially normal to the surface of the substrate and extending along the direction of beam propagation. The rib includes a first portion extending to a first height above the second surface of the slab and a second portion adjacent to the first portion and extending to a second height above the second surface of the slab. The second height is less than the first height.

According to another specific embodiment of the present invention, a waveguide polarization rotator is provided. The waveguide polarization rotator includes a substrate and a waveguide coupled to the substrate and extending along a longitudinal direction of beam propagation. The waveguide includes a slab having a thickness in a transverse direction normal to the substrate. The slab is characterized by a first edge portion extending along a longitudinal direction of beam propagation, a second edge portion opposing the first edge portion, and a top portion disposed between the first edge portion and the second edge portion. The waveguide also includes a rib protruding from the top portion of the slab in the transverse direction and extending along the longitudinal direction of beam propagation. The rib is characterized by a first edge portion extending along the longitudinal direction of beam propagation and disposed at a first lateral distance from the first edge portion of the slab, a second edge portion opposing the first edge portion of the rib and disposed at a second lateral distance from the second edge portion of the slab, and a top portion disposed between the first edge portion and the second edge portion of the rib. The first lateral distance is greater than the second lateral distance. The waveguide polarization rotator also includes a thermal source coupled to the top portion of the rib.

According to a particular embodiment of the present invention, an integrated non-reciprocal polarization rotator is provided. The integrated non-reciprocal polarization rotator includes a substrate having a support surface and a device surface opposing the support surface, thereby defining a substrate thickness. The substrate includes a recessed portion extending to a predetermined depth from the device surface less than the substrate thickness. The integrated non-reciprocal polarization rotator also includes a Faraday crystal mounted in the recessed portion and having a first facet and a second facet opposing the first facet, a first waveguide coupled to the substrate and optically coupled to the first facet of the Faraday crystal, and a second waveguide coupled to the substrate and optically coupled to the second facet of the Faraday crystal.

According to another particular embodiment of the present invention, an integrated photonic polarization-separating apparatus is provided. The integrated photonic polarization-separating apparatus includes a first waveguide polarization beam splitter (PBS) having a first port, a second port, a third port, and a fourth port and a first polarization rotator optically coupled to the first port of the first waveguide PBS. The integrated photonic polarization-separating apparatus also includes a first Faraday rotator optically coupled to the first polarization rotator and a second polarization rotator optically coupled to the second port of the first waveguide PBS. The integrated photonic polarization-separating apparatus further includes a second Faraday rotator optically coupled to the second polarization rotator and a second waveguide PBS having a first port, a second port, a third port, and a fourth port. The third port is optically coupled to the first Faraday rotator and the fourth port is optically coupled to the second Faraday rotator.

According to an embodiment of the present invention, a method of operating an apparatus is provided. The method includes receiving, at a first waveguide polarizing beam splitter (PBS) an input light beam having a TE polarization component and a TM polarization component. The input light beam is propagating downstream. The method also includes rotating the TE polarization component of the input light beam using a first polarization rotator to provide a first rotated TE polarization component of the input light beam and rotating the first rotated TE polarization component of the input light beam using a first Faraday rotator to provide a second rotated TE polarization component of the input light beam. The method further includes rotating the TM polarization component of the input light beam using a second polarization rotator to provide a first rotated TM polarization component of the input light beam, rotating the first rotated TM polarization component of the input light beam using a second Faraday rotator to provide a second rotated TM polarization component of the input light beam, and combining, at a second waveguide PBS, the second rotated TE polarization component and the second rotated TM polarization component of the input light beam to form a recombined input light beam propagating downstream.

According to another embodiment of the present invention, an integrated photonic polarization-separating apparatus is provided. The integrated photonic polarization-separating apparatus includes a first waveguide PBS having a first port, a second port, a third port, and a fourth port, a first polarization rotator optically coupled to the first port of the first waveguide PBS, and a first Faraday rotator optically coupled to the first polarization rotator. The integrated photonic polarization-separating apparatus also includes a second waveguide PBS having a first port, a second port, a third port, and a fourth port. The fourth port is optically coupled to the first Faraday rotator. The integrated photonic polarization-separating apparatus further includes a second polarization rotator optically coupled to the second port of the first waveguide PBS, a second Faraday rotator optically coupled to the second PR, and a third waveguide PBS having a first port, a second port, a third port, and a fourth port. The third port is optically coupled to the second Faraday rotator.

According to a specific embodiment of the present invention, a method of operating an apparatus is provided. The method includes receiving, at a first waveguide polarizing beam splitter (PBS), an input light beam having a TE polarization component and a TM polarization component. The input light beam is propagating downstream. The method also includes rotating the TE polarization component of the input light beam using a first polarization rotator to provide a first rotated TE polarization component of the input light beam and rotating the first rotated TE polarization component of the input light beam using a first Faraday rotator to provide a second rotated TE polarization component of the input light beam. The method further includes rotating the TM polarization component of the input light beam using a second polarization rotator to provide a first rotated TM polarization component of the input light beam and rotating the first rotated TM polarization component of the input light beam using a second Faraday rotator to provide a second rotated TM polarization component of the input light beam.

According to another specific embodiment of the present invention, an integrated photonic polarization-separating apparatus is provided. The integrated photonic polarization-separating apparatus includes a first optical coupler having a first port, a second port, and a third port, a first polarization rotator optically coupled to the second port of the first optical coupler, and a second polarization rotator optically coupled to the third port of the first optical coupler. The integrated photonic polarization-separating apparatus also includes a first waveguide PBS having a first port, a second port, a third port, and a fourth port. The fourth port is optically coupled to the first polarization rotator. The integrated photonic polarization-separating apparatus further includes a second waveguide PBS having a first port, a second port, a third port, and a fourth port. The third port is optically coupled to the second polarization rotator. The integrated photonic polarization-separating apparatus additionally includes a third polarization rotator optically coupled to the first port of the first waveguide PBS, a first Faraday rotator optically coupled to the third polarization rotator, a fourth polarization rotator optically coupled to the first port of the second waveguide PBS, a second Faraday rotator optically coupled to the fourth polarization rotator, and a third waveguide PBS having a first port, a second port, a third port, and a fourth port. The third port is optically coupled to the first Faraday rotator and the fourth port is optically coupled to the second Faraday rotator.

Numerous benefits are achieved by way of the present invention over conventional techniques. For example, embodiments of the present invention provide methods and systems for rotating optical polarization in optoelectronics. The capability to rotate polarization enables monolithic integration of polarization diversity receivers in coherent optical receivers or in systems using polarization multiplexing. For example, through the use of a 90-degree rotator, TE-polarized light can be converted to TM-polarization, and vice versa. This allows the use of a local oscillator (LO) emitting in a single polarization state for the receiver. Monolithic integration allows careful control of path lengths and propagation losses to ensure that power balance and phase relationships are maintained in applications such as balanced receivers. Furthermore, the use of a combination of 45-degree reciprocal and non-reciprocal rotators allows the implementation of devices such as isolators on a single substrate. This is of importance for future generations of low-cost photonic-electronic packages that may have reflective interfaces that would otherwise destabilize the operation of the chip.

These and other embodiments of the invention along with many of its advantages and features are described in more detail in conjunction with the text below and attached figures.

DETAILED DESCRIPTION OF SPECIFIC EMBODIMENTS

Photonic polarization beam splitters integrated on silicon are preferable for the commercial deployment of optoelectronic integrated circuits. Silicon is a preferable material for electronic integration. Silicon technology has advanced such that extremely complex electronic functions can be realized very inexpensively. Embodiments of the present invention relate to systems and methods for integrated photonic polarization beam splitters.

Figure 1A:
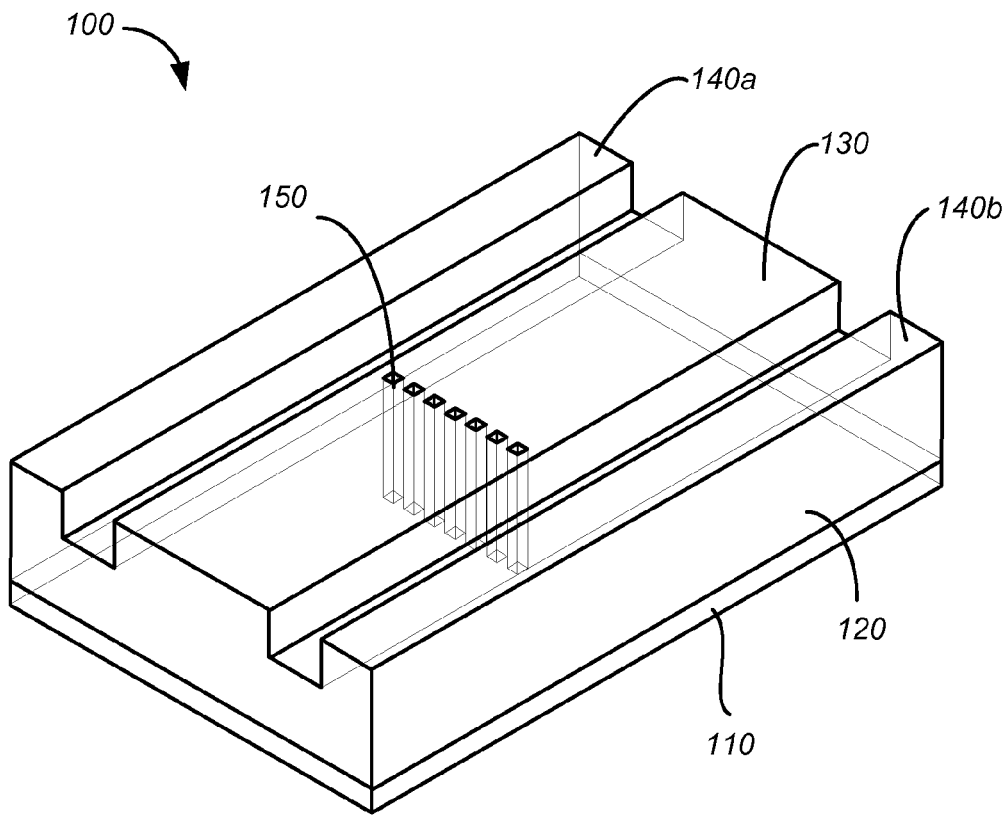
FIGS. 1A and 1B are a perspective view and a cross-sectional view, respectively, of a simplified schematic diagram illustrating a waveguide polarizer including an array of embedded structures according to an embodiment of the invention.
Figure 1B:
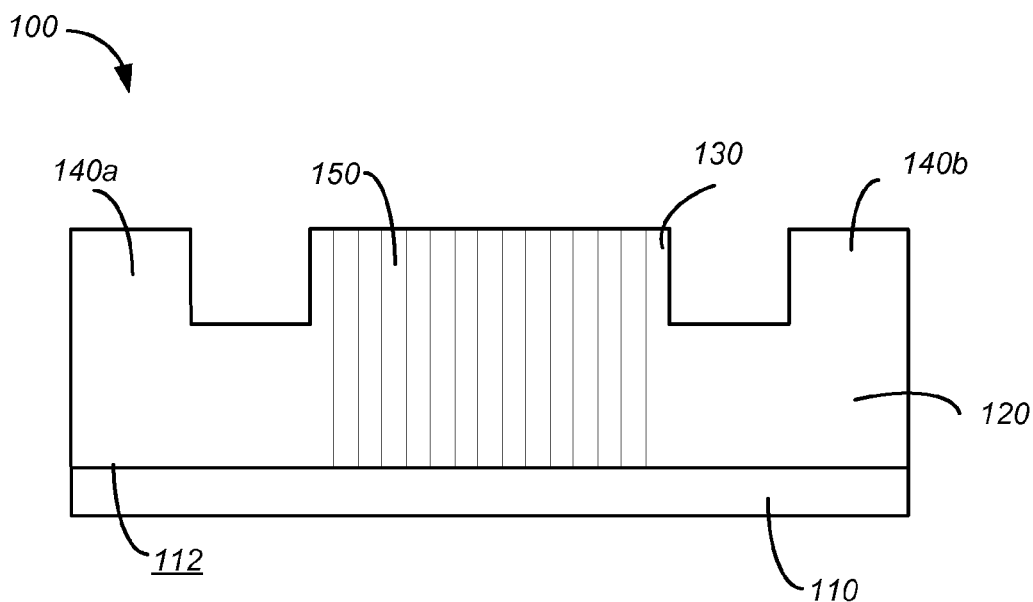

FIGS. 1A and 1B are a perspective view and a cross-sectional view, respectively, of a simplified schematic diagram illustrating a waveguide polarizer 100 including an array of embedded structures 150 according to an embodiment of the invention. The waveguide polarizer 100 includes a substrate 110 having a surface 112, and a waveguide 120 coupled to the surface 112 of the substrate 110. The waveguide 120 includes a beam propagation portion 130, and two side portions 140a and 140b flanking the beam propagation portion 130. The waveguide polarizer 100 further includes a plurality of structures 150 disposed as a one-dimensional array inside the beam propagation portion 130 of the waveguide 120. The plurality of structures 150 are aligned substantially perpendicular to the surface 112 of the substrate 110 in a plane substantially perpendicular to a direction of light propagation. The waveguide polarizer 100 is operable to transmit an incident light beam with an electric field vector aligned parallel to the surface 112 of the substrate 110 (referred herein as the TE polarization), and block at least a portion of an incident light beam with an electric field vector aligned perpendicular to the surface 112 of the substrate 110 (referred herein as the TM polarization).

According to an embodiment, the plurality of structures 150 in the waveguide polarizer 100 is formed by a process in which an array of vias is etched across a width of the beam propagation portion 130 of the waveguide 120, and a conductive material is subsequently formed (e.g., by plating) in the vias. The conductive material may include, for example, copper, aluminum, nickel, a doped semiconductor material, carbon nanotube material, combinations thereof, or the like.

Figure 2A:
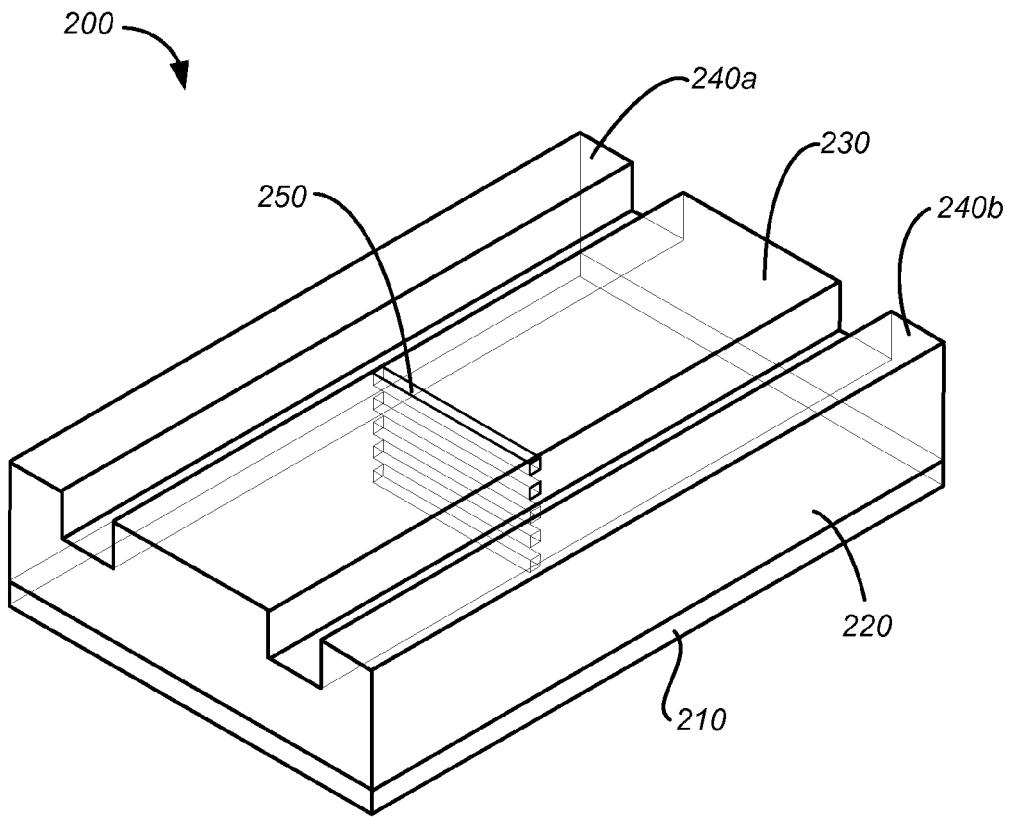
FIGS. 2A and 2B are a perspective view and a cross-sectional view, respectively, of a simplified schematic diagram illustrating a waveguide polarizer including an array of embedded structures according to another embodiment of the invention.
Figure 2B:
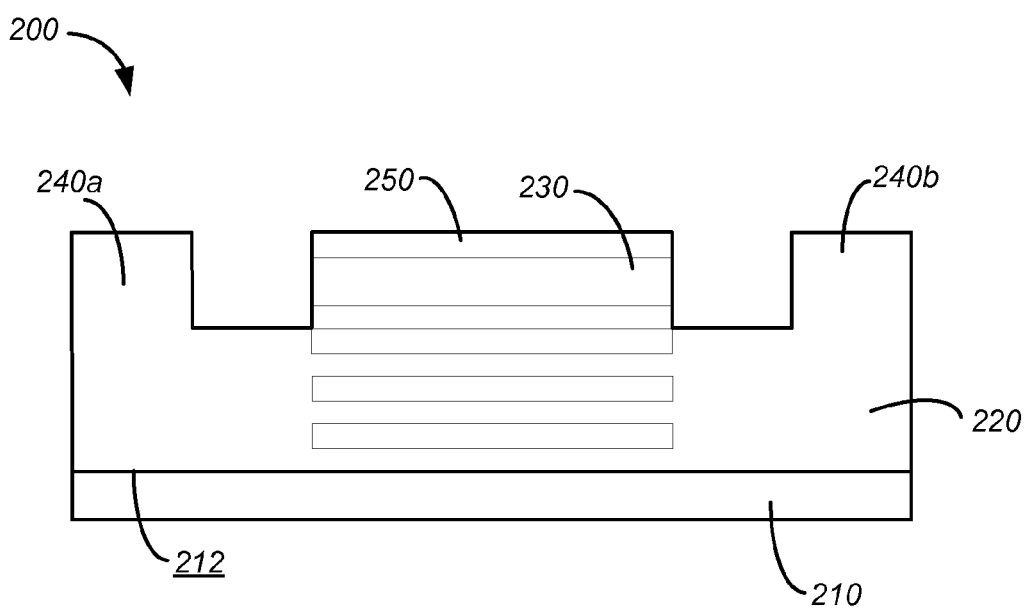

FIGS. 2A and 2B are a perspective view and a cross-sectional view, respectively, of a simplified schematic diagram illustrating a waveguide polarizer 200 including an array of embedded structures 250 according to another embodiment of the invention. The waveguide polarizer 200 includes a substrate 210 having a surface 212, and a waveguide 220 coupled to the surface 212 of the substrate 210. The waveguide 220 includes a beam propagation portion 230, and two side portions 240a and 240b flanking the beam propagation portion 230. The waveguide polarizer 200 further includes a plurality of structures 250 disposed as a one-dimensional array inside the beam propagation portion 230 of the waveguide 220. The plurality of structures 250 are aligned substantially parallel to the surface 212 of the substrate 210 in a plane substantially perpendicular to a direction of light propagation. The waveguide polarizer 200 is operable to transmit an incident light beam with a TM polarization, and block at least a portion of an incident light beam with a TE polarization.

According to an embodiment, the plurality of structures 250 in the waveguide polarizer 200 is formed by a process in which a slot is etched across a width of the beam propagation portion 230 of the waveguide 220, and alternating layers of a conductive material and of a dielectric material, respectively, are subsequently formed (e.g., by deposition) in the slot. The conductive material may include, for example, copper, aluminum, nickel, a doped semiconductor material, carbon nanotube material, combinations thereof, or the like. The dielectric material may comprise, for example, amorphous silicon (α-Si) or other suitable materials.

According to embodiments of the present invention, the plurality of structures 150 are disposed at a spacing, and characterized by one or more dimensions suitable for providing an optical filtering function (e.g., transmitting TE polarized light and blocking at least a portion of TM polarized light). Accordingly, the dimensions are typically on the order of a fraction of the wavelength of light propagating in the propagation portion 130 of the waveguide 120. In an exemplary embodiment, the plurality of structures 150 or 250 in the waveguide polarizer 100 or 200 comprises nanostructures having a dimension less than a wavelength of the incident light beam. Further, a spacing between adjacent nanostructures is less than a wavelength of the incident light beam. According to an embodiment, the substrate 110 or 210 comprises a silicon substrate, a silicon-on-insulator (SOI) substrate, or the like.

Figure 3:
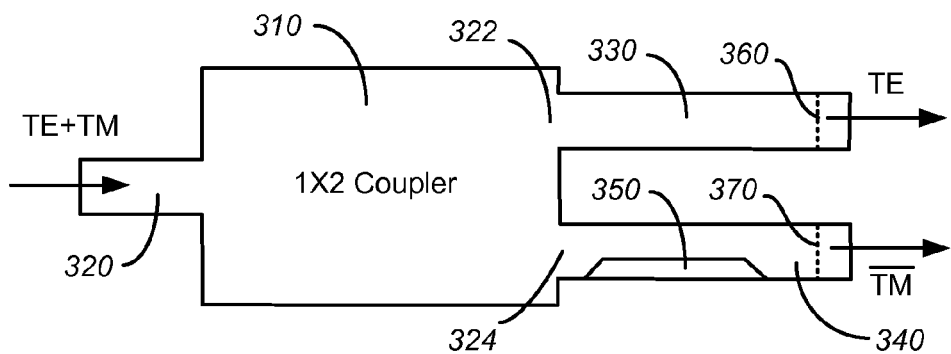
FIG. 3 is a plan view of a simplified schematic diagram illustrating an integrated polarization beam splitter including a 1×2 optical coupler and two embedded polarizers according to an embodiment of the invention.

FIG. 3 is a plan view of a simplified schematic diagram illustrating an integrated polarization beam splitter (PBS) 300 according to an embodiment of the invention. The integrated PBS 300 includes an optical coupler 310 having an input port 320, a first output port 322, and a second output port 324. The optical coupler 310 is operable to couple a portion of an input light beam at the input port 320 into the first output port 322, and another portion of the input light beam into the second output port 324. The optical coupler 310 may comprise, for example, a multimode interference (MMI) coupler or an optical coupler of other types. According to an embodiment, the optical coupler 310 comprises a 3 dB optical coupler. The integrated PBS 300 further includes a first waveguide 330 coupled to the first output port 322 of the optical coupler 310, and a second waveguide 340 coupled to the second output port 324 of the optical coupler 310. According to an embodiment, the integrated PBS 300 includes a substrate having a surface, to which the optical coupler 310, the first waveguide 330, and the second waveguide 340 are coupled. The substrate may comprise a silicon substrate, an SOI substrate, or the like.

According to an embodiment, the first waveguide 330 includes a first linear polarizer 360 embedded therein. The first linear polarizer 360 is characterized by a polarization direction, and is operable to transmit a TE polarization component of the portion of the input light beam coupled into the first output port 322 of the optical coupler 310, and block at least a portion of a TM polarization component of the portion of the input light beam coupled into the first output port 322 of the optical coupler 310. The second waveguide 340 includes a second linear polarizer 370 embedded therein. The second linear polarizer 370 is characterized by a polarization direction that is substantially parallel to the polarization direction of the first linear polarizer 360. The second waveguide 340 further includes an embedded polarization rotator 350 disposed between the second output port 324 of the optical coupler 310 and the second linear polarizer 370. The polarization rotator is operable to rotate a polarization direction of a light beam by about 90 degrees. Therefore, as a light beam propagates through the polarization rotator, a TE polarization component of the light beam becomes polarized in a direction perpendicular to the surface of the substrate, and a TM polarization component of the light beam becomes polarized in a direction parallel to the surface of the substrate (the rotated TM polarization component is denoted by TM with a bar at the top in FIG. 3). As such, the second linear polarizer 370 is operable to transmit a TM polarization component of the another portion of the input light beam coupled into the second output port 324 of the optical coupler 310, and block a TE polarization component of the another portion of the input light beam coupled into the second output port 324 of the optical coupler 310. According to an embodiment, each of the first linear polarizer 360 and the second linear polarizer 370 is similar to the linear polarizer 100 illustrated in FIGS. 1A and 1B, in which the embedded structures 150 are aligned perpendicular to the surface 112 of the substrate 110.

Figure 4:
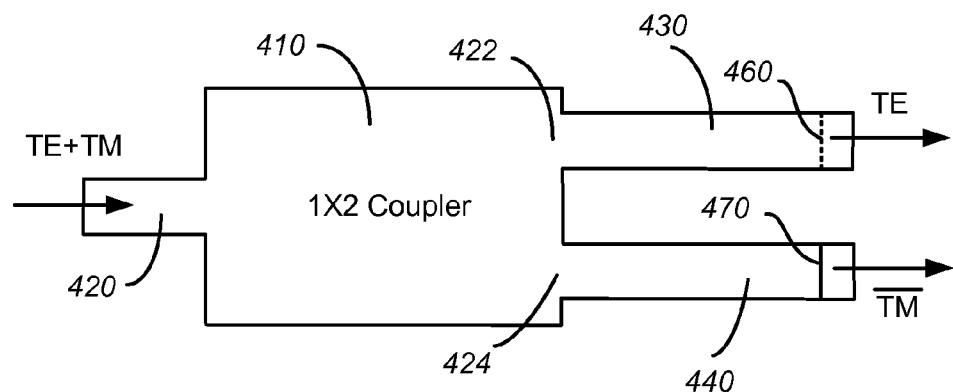
FIG. 4 is a plan view of a simplified schematic diagram illustrating an integrated polarization beam splitter including a 1×2 optical coupler and two embedded polarizers according to another embodiment of the invention.

FIG. 4 is a plan view of a simplified schematic diagram illustrating an integrated PBS 400 according to another embodiment of the invention. The integrated PBS 400 includes an optical coupler 410 having an input port 420, a first output port 422, and a second output port 424. The integrated PBS 400 further includes a first waveguide 430 coupled to the first output port 422 of the optical coupler 410, and a second waveguide 440 coupled to the second output port 424 of the optical coupler 410. According to an embodiment, the integrated PBS 400 includes a substrate having a surface, to which the optical coupler 410, the first waveguide 430, and the second waveguide 440 are coupled. The optical coupler 410 may comprise, for example, an MMI coupler or an optical coupler of other types. According to an embodiment, the optical coupler 410 comprises a 3 dB optical coupler. According to an embodiment, the integrated PBS 400 includes a substrate having a surface, to which the optical coupler 410, the first waveguide 430, and the second waveguide 440 are coupled. The substrate may comprise a silicon substrate, an SOI substrate, or the like.

According to an embodiment, the first waveguide 430 includes a first linear polarizer 460 embedded therein. The first linear polarizer 460 is characterized by a polarization direction, and is operable to transmit a TE polarization component of the portion of the input light beam coupled into the first output port 422 of the optical coupler 410, and block at least a portion of a TM polarization component of the portion of the input light beam coupled into the first output port 422 of the optical coupler 410. According to an embodiment, the first linear polarizer 460 is similar to the linear polarizer 100 illustrated in FIGS. 1A and 1B, in which the embedded structures 150 are aligned perpendicular to the surface 112 of the substrate 110. The second waveguide 440 includes a second linear polarizer 470 embedded therein. The second linear polarizer 470 is characterized by a polarization direction that is substantially perpendicular to the polarization direction of the first linear polarizer 460, and is operable to transmit a TM polarization component of the another portion of the input light beam coupled into the second output port 424 of the optical coupler 410, and block a TE polarization component of the another portion of the input light beam coupled into the second output port 424 of the optical coupler 410. According to an embodiment, the second linear polarizer 470 is similar to the linear polarizer 200 illustrated in FIGS. 2A and 2B, in which the embedded structures 250 are aligned parallel to the surface 212 of the substrate 210.

Figure 5:
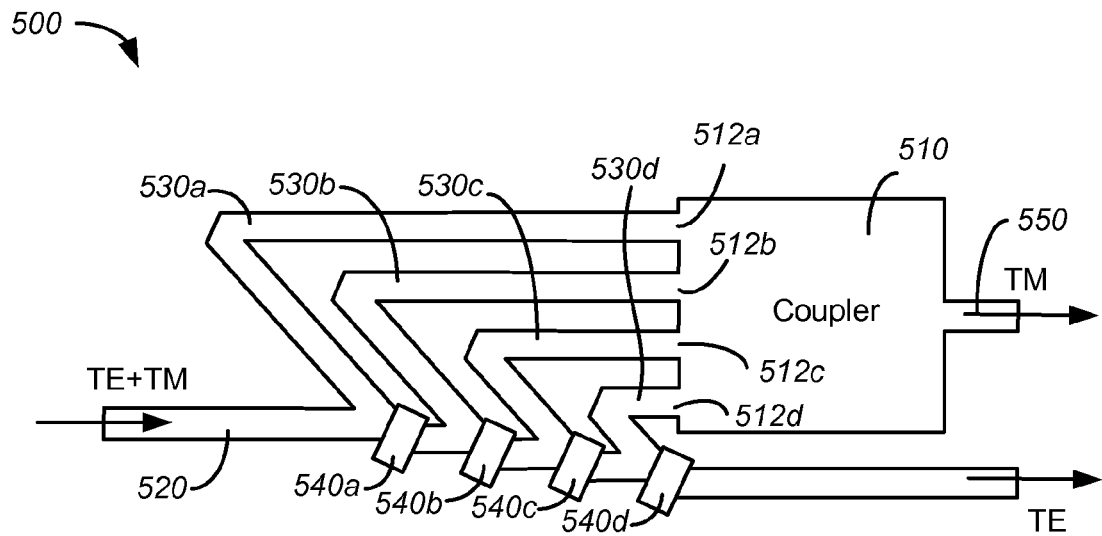
FIG. 5 is a plan view of a simplified schematic diagram illustrating an integrated polarization beam splitter including a plurality of Brewster reflectors and an optical coupler for combining a plurality of Brewster-reflecting segments according to an embodiment of the invention.

FIG. 5 is a plan view of a simplified schematic diagram illustrating an integrated PBS 500 according to an embodiment of the invention. The integrated PBS 500 includes at least one reflector 540a disposed at Brewster's angle and operable to reflect a portion of an input light beam and transmit another portion of the input light beam. As is known in the art, for a light beam incident on a reflector at Brewster's angle, the reflected portion of the incident light beam is s-polarized (i.e., the polarization direction is perpendicular to the plane of incidence, referred herein as the TM polarization), and the transmitted portion of the incident light beam is partially p-polarized (i.e., the polarization direction is parallel to the plane of incidence, referred herein as the TE polarization) and partially s-polarized.

The integrated PBS 500 further includes an optical coupler 510 and at least one waveguide segment 530a. The optical coupler 510 has at least one input port 512a and an output port 550. The optical coupler 510 may comprise, for example, an MMI coupler or an optical coupler of other types. The at least one waveguide segment 530a is operable to couple the portion of the input light beam reflected by the at least one reflector 540a into the at least one input port 512a of the optical coupler 510. An index of refraction of the at least one reflector 540a is higher than a modal index of refraction of the at least one waveguide segment 530a. The at least one waveguide segment 530a may comprise, for example, silicon oxide, silicon nitride, silicon oxynitride, combinations thereof, or the like. The at least one reflector 540a may comprise, for example, crystalline silicon, amorphous silicon, or the like. According to an embodiment, the at least one waveguide segment 530a comprises crystalline silicon and the at least one reflector 540a comprises amorphous silicon. According an embodiment, the integrated PBS 500 further includes a substrate having a surface, to which the optical coupler 510, the at least one reflector 540a, and the at least one waveguide segment 530a are coupled. The substrate may comprise a silicon substrate, an SOI substrate, or the like.

To achieve a higher extinction ratio, multiple reflectors disposed at Brewster's angle may be incorporated. For example, as illustrated in FIG. 5, the integrated PBS 500 may include four reflectors 540a-540d disposed at Brewster's angle and configured in a serial manner such that each succeeding reflector reflects a portion of a light beam transmitted by a proceeding reflector and transmits another portion of the light beam transmitted by the proceeding reflector. As each reflector reflects an additional s-polarized portion of the incident light beam, the transmitted light beam becomes more and more purely p-polarized after each reflector. The multiple light beams reflected by the multiple reflectors may be combined by the optical coupler 510 to produce a combined s-polarized (i.e., TM polarized) beam at the output port 550 of the optical coupler 510. In the example shown in FIG. 5, the integrated PBS includes four waveguide segments 530a-530d, and the optical coupler 510 includes four input ports 512a-512d. The first waveguide segment 530a is configured to couple a light beam reflected by the first reflector 540a into the first input port 512a of the optical coupler 510. The second waveguide segment 530b is configured to couple a light beam reflected by the second reflector 540b into the second input port 512b of the optical coupler 510, and so on and so forth. The plurality of waveguide segments 530a-530d are configured such that the optical pathlength difference between any pair of reflected light beams are integer multiples of a wavelength of the light beam, so that the plurality of light beams coupled into the plurality of input ports 512a-512d are substantially in phase with respect to each other. According to other embodiments, more than four or less than four reflectors may be used. One of ordinary skill in the art would recognize many variations, modifications, and alternatives.

Figure 6:
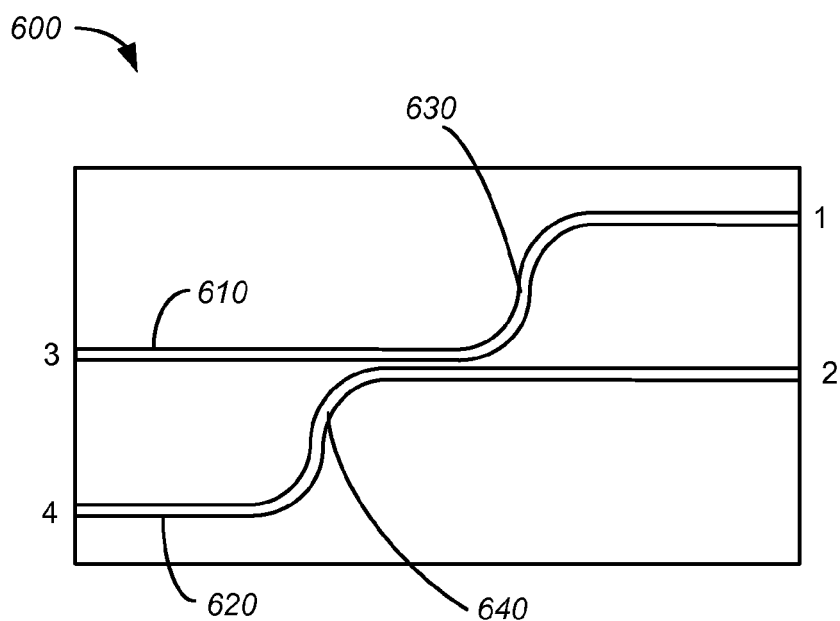
FIG. 6 is a plan view of a simplified schematic diagram illustrating a birefringent waveguide polarization beam splitter according to an embodiment of the invention.

Waveguide PBS's may be constructed by exploiting the birefringence properties of waveguides. FIG. 6 is a plan view of a simplified schematic diagram illustrating a waveguide PBS 600 according to an embodiment of the invention. The waveguide PBS 600 includes a first waveguide 610 and a second waveguide 620 coupled to each other at least along a section thereof. The waveguide PBS 600 includes four ports (labeled as 1-4 in FIG. 6), wherein a first port is coupled to an end of the first waveguide 610, a third port is coupled to an opposite end of the first waveguide 610, a second port is coupled to an end of the second waveguide 620, and a fourth port is coupled to an opposite end of the second waveguide 620. Each of the first waveguide 610 and the second waveguide 620 includes a curved section 630 and 640, respectively. Because of the birefringence properties of the waveguides, a TE polarization component of a light beam that is input into one of the four ports is coupled into a bar-port, i.e., a port that is coupled to the same waveguide as the input port. On the other hand, a TM polarization component of a light beam is coupled into a cross-port, i.e., a port that is coupled to a different waveguide as the input port. Tables 1 and 2 summarize the port mappings for the TE and TM modes, respectively. One skilled in the art would recognize that other embodiments may be possible that change the port mapping such that TE modes map to cross ports and TM modes map to bar ports.

TABLE 1

Port mappings for TE mode

| Input Port | Output Port |
|---|---|
| 1 | 3 |
| 2 | 4 |
| 3 | 1 |
| 4 | 2 |

TABLE 2

Port mappings for TM mode

| Input Port | Output Port |
|---|---|
| 1 | 4 |
| 2 | 3 |
| 3 | 2 |
| 4 | 1 |

According to an embodiment, the waveguide PBS 600 comprises a single-stage waveguide PBS. Extinction ratios ranging from about 10 dB to about 15 dB may be achieved in a single-stage waveguide PBS. According to another embodiment, the waveguide PBS 600 comprises a double-stage waveguide PBS. Extinction ratios ranging from about 15 dB to about 20 dB may be achieved in a double-stage waveguide PBS. According to embodiments, each of the first waveguide 610 and the second waveguide 620 may comprise superlattices of binary, ternary, or quarternary group III-V semiconductors, such as a GaInAsP/InP superlattice. Other anisotropic crystalline materials may also be used. One of ordinary skill in the art would recognize many variations, modifications, and alternatives.

According to other embodiments, other types of waveguide PBS include birefringent MMI waveguide PBS and mode-evolution-based waveguide PBS. A birefringent MMI waveguide PBS utilizes two MMI couplers connected by two waveguides with different widths. Extinction ratios ranging from about 10 dB to about 20 dB may be achieved in a birefringent MMI waveguide PBS. A mode-evolution-based waveguide PBS utilizes two waveguide sections coupled to each other at an input end thereof. The waveguide sections are configured such that a TE polarization component of an input light beam is supported in one of the two waveguide sections, and a TM polarization component of the input light beam is supported in the other one of the two waveguide sections. A mode-evolution-based waveguide PBS may achieve good extinction ratios over a broad wavelength range.

Photonic polarization rotators integrated on silicon are preferable for the commercial deployment of optoelectronic integrated circuits. Silicon is a preferable material for electronic integration. Silicon technology has advanced such that extremely complex electronic functions can be realized very inexpensively. Embodiments of the present invention relate to systems and methods for integrated photonic polarization rotators.

A polarization rotator is an optical device that rotates the polarization axis of a linearly polarized light beam by a selected angle of choice. There are two types of polarization rotators: reciprocal and non-reciprocal polarization rotators. For a reciprocal polarization rotator, a light beam propagating in a reverse direction undergoes a rotation in the opposite direction as the rotation experienced by a light beam propagating in a forward direction. For example, reflecting a polarized beam back through a reciprocal polarization rotator would undo the polarization change the beam underwent in its forward pass through the reciprocal polarization rotator. For a non-reciprocal polarization rotator, a light beam propagating in a reverse direction undergoes a rotation in the same direction as the rotation experienced by a light beam propagating in a forward direction. For example, reflecting a polarized beam back through a non-reciprocal polarization rotator would not undo the polarization change the beam underwent in its forward pass through the non-reciprocal polarization rotator. Non-reciprocal polarization rotators may be constructed using Faraday crystals. In the remainder of this disclosure, non-reciprocal polarization rotators are referred as Faraday rotators, and reciprocal polarization rotators are referred as simply polarization rotators. Polarization rotators may be constructed exploiting the birefringence properties of waveguides.

Figure 7:
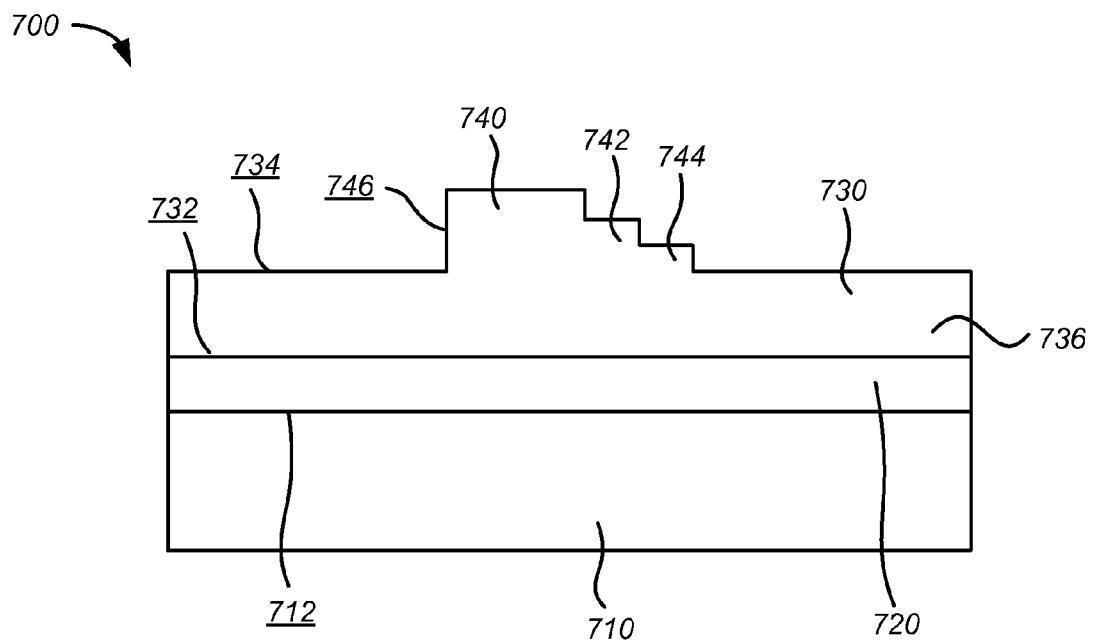
FIG. 7 is a cross-sectional view of a simplified schematic diagram illustrating a waveguide polarization rotator utilizing a stepped waveguide according to an embodiment of the invention.

FIG. 7 is a cross-sectional view of a simplified schematic diagram illustrating a waveguide polarization rotator (PR) 700 utilizing a stepped waveguide according to an embodiment of the invention. The waveguide PR 700 includes a substrate 710 having a surface 712, and a waveguide 730 coupled to the surface 712 of the substrate 710 and operable to support a light beam along a direction of beam propagation. The waveguide 730 comprises a slab 736 having a support surface 732 and a second surface 734 opposing the support surface 732. The waveguide 730 further comprises a rib 740 protruding from the second surface 734 of the slab 736 in a direction substantially normal to the surface 712 of the substrate 710 and extending along the direction of beam propagation (i.e., a direction normal to the page). The rib 740 comprises a first portion 740 extending to a first height above the second surface 734 of the slab 736, and a second portion 742 adjacent to the first portion and extending to a second height above the second surface 734 of the slab 736. The second height is less than the first height. The substrate 710 may comprise a silicon substrate, an SOI substrate, a compound semiconductor substrate, or the like.

According to other embodiments, the waveguide PR 700 further comprises additional portions 744 (for simplicity, only a single additional portion is illustrated in FIG. 7), each of the additional portions 744 successively extending to progressively reduced height less than the height of the adjacent portion. Thus, the cross-sectional profile of the rib 740 comprises a vertical wall 746 on one side and a plurality of steps on the other side. The stepped waveguide PR 700 approximates a tapered waveguide PR, but is less challenging to fabricate than a tapered waveguide. However, fewer steps may introduce substantial propagation loss. According to embodiments, the number of steps is determined as a trade-off between fabrication complexity and propagation loss.

According to an embodiment, the second portion 742 and the additional portions 744 are characterized by a width defined in a direction orthogonal to the normal to the surface of the substrate and the direction of beam propagation (i.e., a direction normal to the plane of the figure). The height-to-width ratio for the second portion and the additional portions is defined by a height difference between adjacent portions divided by the width of the portion. According to an embodiment, the height-to-width ratio is substantially constant from one portion to the next. In this case, the height-to-width ratio is analogous to a slope of a tapered waveguide PR. A polarization rotation angle may be determined by the height-to-width ratio as well as a length of the waveguide 730 (extending in a direction normal to the plane of the figure). According to an embodiment, the waveguide 730 has a predetermined length such that a polarization of a light beam propagating through the waveguide 730 is rotated by a predetermined angle, for example 90 degrees.

Figure 8:
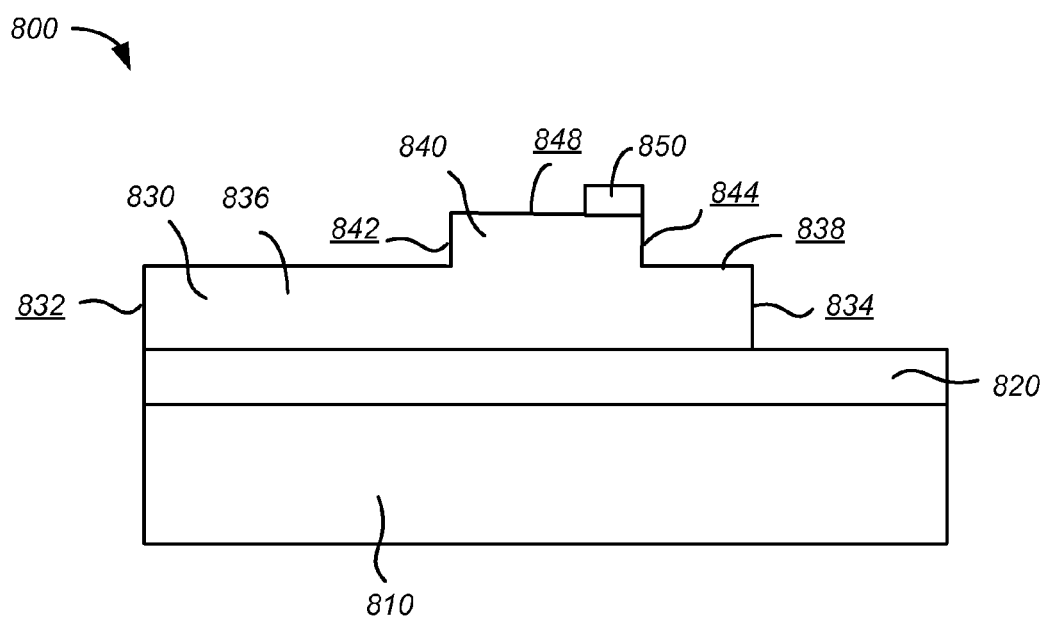
FIG. 8 is a cross-sectional view of a simplified schematic diagram illustrating a waveguide polarization rotator utilizing an asymmetric thermal gradient according to an embodiment of the invention.

FIG. 8 is a cross-sectional view of a simplified schematic diagram illustrating a waveguide PR 800 utilizing an asymmetric thermal gradient according to an embodiment of the invention. The waveguide PR 800 includes a substrate 810, and a waveguide 830 coupled to the substrate 810 and operable to support a light beam along a direction of beam propagation (i.e., a direction normal to the figure). The substrate may comprise a silicon substrate, an SOI substrate, or the like. The waveguide 830 comprises a slab 836 having a thickness in a transverse direction normal to the substrate. The slab 836 is characterized by a first edge portion 832 extending along a longitudinal direction of beam propagation, a second edge portion 834 opposing the first edge portion 832, and a top portion 838 disposed between the first edge portion 832 and the second edge portion 834. The waveguide 830 further comprises a rib 840 protruding from the top portion 838 of the slab 836 in the transverse direction and extending along the longitudinal direction of beam propagation. The rib 840 is characterized by a first edge portion 842 extending along the longitudinal direction of beam propagation and disposed at a first lateral distance from the first edge portion 832 of the slab 836, a second edge portion 844 opposing the first edge portion 842 of the rib 840 and disposed at a second lateral distance from the second edge portion 834 of the slab 836, and a top portion 848 disposed between the first edge portion 842 and the second edge portion 844 of the rib 840. The first lateral distance is greater than the second lateral distance.

The waveguide PR 800 further comprises a thermal source 850 coupled to the top portion 848 of the rib 840. The thermal source 850 is adjacent the second edge portion 844 of the rib 840 in the illustrated embodiment. Because of the asymmetric configuration of the rib 840 with respect to the slab 836, coupled with the asymmetric configuration of the thermal source 850 with respect to the rib 840, an asymmetric thermal gradient may be created in the waveguide 830 with respect to the plane of the substrate 810. In the illustrated embodiment, the asymmetric thermal gradient is characterized by a higher temperature adjacent thermal source 850, providing a transverse gradient. Consequently, an asymmetric index profile may be created in the waveguide 830 with respect to the plane of the substrate 810, such that the waveguide 830 may function as a polarization rotator as a light beam propagates through the waveguide 830. According to an embodiment, the thermal source 850 comprises a plurality of heating elements disposed at discrete distances along the longitudinal direction of propagation. In an embodiment, each of the plurality of heating elements may comprise a thin film resistor formed by deposition of a material such as W, NiCr, TaN, WSi, $RuO_2$, PbO, $Bi_2Ru_2O_7$, $Bi_2Ir_2O_7$, or the like. An electrical power applied to each of the plurality of heating elements may be adjusted such that a polarization of a light beam is rotated by a predetermined angle as the light beam propagates through the waveguide 830. In other embodiments, a single heating element is utilized.

Figure 9A:
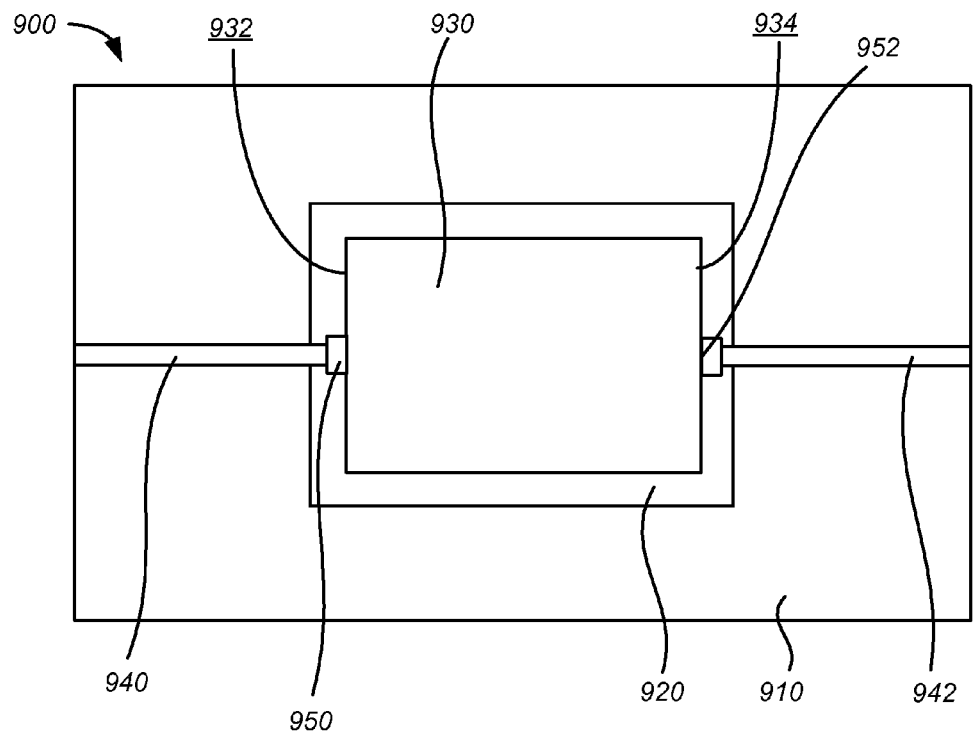
FIGS. 9A and 9B are a plan view and a cross-sectional view, respectively, of a simplified schematic diagram illustrating a non-reciprocal polarization rotator utilizing a Faraday crystal according to an embodiment of the invention.
Figure 9B:
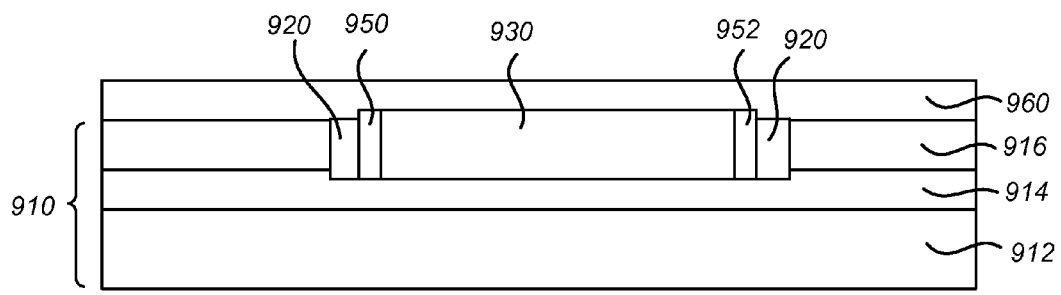

A non-reciprocal polarization rotator may be constructed using a Faraday rotator (FR). A FR is an optical device that rotates the polarization of a light beam due to the Faraday effect. A plane of linearly polarized light is rotated when a magnetic field is applied parallel (or anti-parallel) to the direction of propagation. FIGS. 9A and 9B are a plan view and a cross-sectional view, respectively, of a simplified schematic diagram illustrating an integrated FR 900 according to an embodiment of the invention. The FR 900 comprises a substrate 910. According to an embodiment, the substrate 910 includes a silicon handle wafer 912, an oxide layer 914 coupled to the silicon handle wafer 912, and a silicon device layer 916 coupled to the oxide layer 914. It should be appreciated that other types of substrates may also be used. One of ordinary skill in the art would recognize many variations, modifications, and alternatives.

The FR 900 further comprises a coupling waveguide fill region 920 extending through the silicon device layer 916, and a Faraday crystal 930 mounted in the coupling waveguide fill region 920. The coupling waveguide fill region 920 may include amorphous silicon or other material with a refractive index selected to minimize reflections and coupling losses at the material interfaces. The Faraday crystal 930 has a first facet 932, and a second facet 934 opposing the first facet 932. According to an embodiment, the Faraday crystal 930 extends to a depth within the oxide layer 914 as shown in FIG. 9B. According to other embodiments, the Faraday crystal 930 may extend to a depth within the silicon handle wafer 912. According to an embodiment, the Faraday crystal 930 extends above the silicon device layer 916. According to other embodiments, the Faraday crystal 930 may have other configurations. One of ordinary skill in the art would recognize many variations, modifications, and alternatives.

The FR 900 further comprises a first waveguide 940 coupled to the substrate 910 and optically coupled to the first facet 932 of the Faraday crystal 930, and a second waveguide 942 coupled to the substrate 910 and optically coupled to the second facet 934 of the Faraday crystal 930. According to an embodiment, the FR 900 further comprises a first index matching region 950 disposed between the first waveguide 940 and the first facet 932 of the Faraday crystal 930, and a second index matching region 952 disposed between the second waveguide 942 and the second facet 934 of the Faraday crystal 930. The first index matching region 950 and the second index matching region 952 are provided to facilitate a high degree of optical coupling between the Faraday crystal 930 and each of the first waveguide 940 and the second waveguide 942.

According to an embodiment, the Faraday crystal 930 may be integrated with the first waveguide 940 and the second waveguide 942 on the substrate 910 using a template assisted bonding (TAB) process, as described in U.S. patent application Ser. No. 13/112,142, entitled "Method and System for Template Assisted Wafer Bonding," the disclosure of which is hereby incorporated by reference in its entirety for all purposes. According to an embodiment, a planarizing layer 960 is formed over the FR 900 after the TAB process. Additional layers may be formed over the planarizing layer 960.

According to an embodiment, the Faraday crystal 930 comprises a permanently polled material, such as bismuth europium holmium gallium iron garnet, bismuth yttrium iron garnet, or the like. Exposure to elevated temperatures above about 170° C. during the TAB process may cause a Faraday crystal to revert to a non-polled state. In this case, the Faraday crystal may be re-polled after exposure to elevated temperatures. According to another embodiment, the Faraday crystal 930 comprises a non-polled material, such as yttrium iron garnet, bismuth-doped iron garnet, or the like. The FR 900 may include one or more external magnets integrated after the TAB process although this is not required by the present invention.

Photonic polarization-separating apparatuses integrated on silicon are preferable for the commercial deployment of optoelectronic integrated circuits. Silicon is a preferable material for electronic integration. Silicon technology has advanced such that extremely complex electronic functions can be realized very inexpensively. Embodiments of the present invention relate to systems and methods for photonic polarization-separating apparatuses for optical network applications.

Figure 10A:
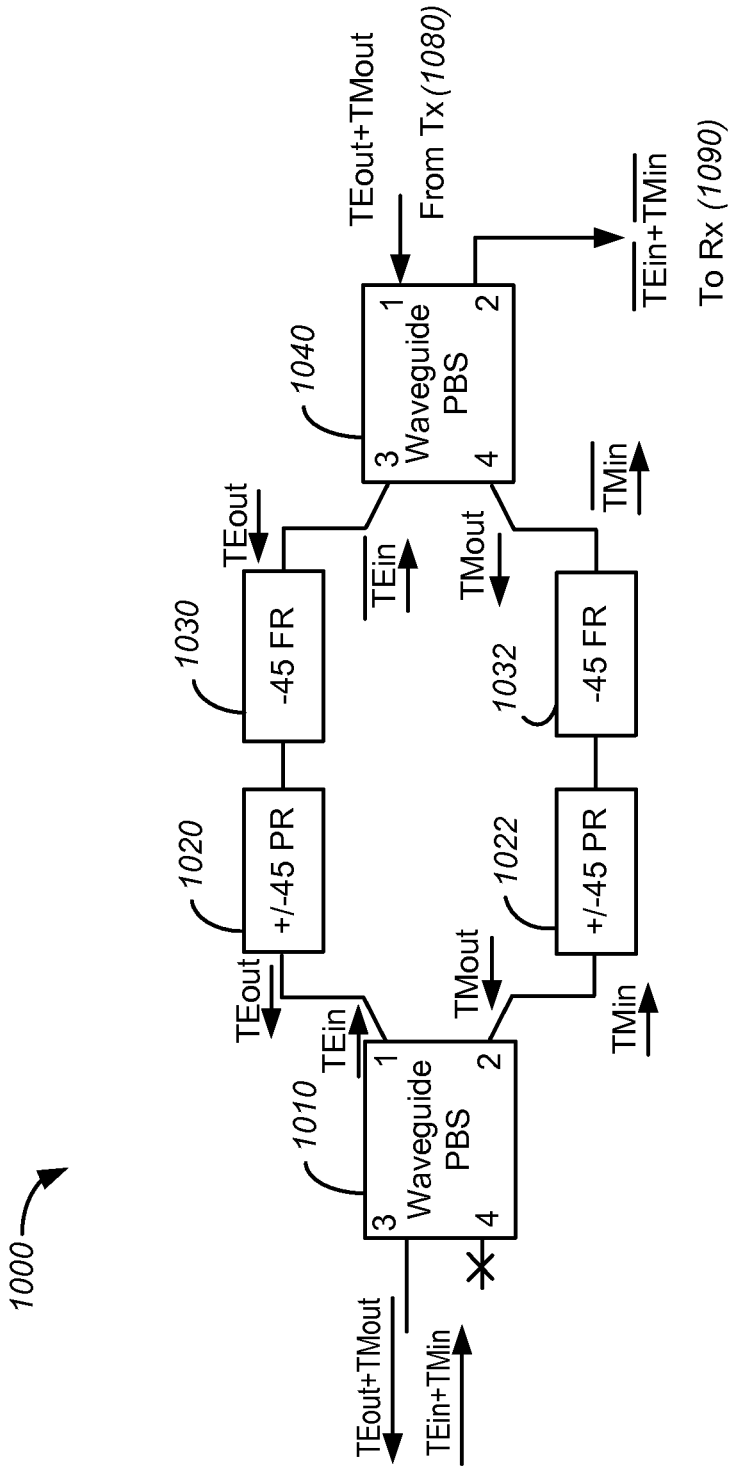
FIGS. 10A-10C are simplified block diagrams illustrating an integrated polarization-separating apparatus according to various embodiments of the invention.

FIG. 10A is a simplified block diagram illustrating an integrated polarization-separating apparatus 1000 according to an embodiment of the invention. The polarization-separating apparatus 1000 comprises a first waveguide polarization beam splitter (PBS) 1010 having four ports (labeled 1-4 in FIG. 10A). The port mappings for the first waveguide PBS 1010 are the same as those shown in Tables 1 and 2. The first waveguide PBS 1010 is operable to receive an input light beam at a third port thereof, and transmit the TE polarization component of the input light beam (referred herein as TEin) and the TM polarization component of the input light beam (referred herein as TMin) at a first port and a second port thereof, respectively.

The polarization-separating apparatus 1000 further comprises a first polarization rotator (PR) 1020 optically coupled to the first port of the first waveguide PBS 10110, a first Faraday rotator (FR) 1030 optically coupled to the first PR 1020, a second PR 1022 optically coupled to the second port of the first waveguide PBS 1010, and a second FR 1032 optically coupled to the second PR 1022. According to an embodiment, each of the first PR 1020 and the second PR 1022 comprises a 45-degree PR, and each of the first FR 1030 and the second FR 1032 comprises a negative 45-degree FR. (As discussed above, a light beam propagating in a reverse direction undergoes a rotation in the opposite direction as the rotation experienced by a light beam propagating in a forward direction. Therefore, each of the first PR 1020 and the second PR 1022 is denoted as +/−45 PR in FIG. 10A. Similar notations are used for reciprocal polarization rotators in FIGS. 10B, 10C, 12, and 14.) The combination of the first PR 1020 and the first FR 1030 is operable to rotate the polarization of a light beam propagating down-stream (i.e., propagating from the left to the right in FIG. 10A) by about 90 degrees, and rotate the polarization of a light beam propagating up-stream (i.e., propagating from the right to the left in FIG. 10A) by about 0 degrees. Therefore, the polarization of the TE polarized input light (TEin), which propagates down-stream, is rotated by about 90 degrees after passing through the first PR 1020 and the first FR 1030. (TEin light whose polarization has been rotated by about 90 degrees with respect to the polarization of the original TEin is denoted by $\overline{\text{TEin}}$ in the figures. Similar notation is used for TM polarized input light (TMin). Similarly, the combination of the second PR 1022 and the second FR 1032 are operable to rotate the polarization of a light beam propagating down-stream by about 90 degrees, and rotate the polarization of a light beam propagating up-stream by about 0 degrees. Therefore, the polarization of TMin, which propagates down-stream, is rotated by about 90 degrees after passing through the second PR 1022 and the second FR 1032. (TMin light whose polarization has been rotated by about 90 degrees with respect to the polarization of the original TMin is denoted by $\overline{\text{TMin}}$ in the figures.)

The polarization-separating apparatus 1000 further comprises a second waveguide PBS 1040 having four ports. A third port and a fourth port of the second waveguide PBS 1040 are optically coupled to the first FR 1030 and the second FR 1032, respectively. The port mappings of the second waveguide PBS 1040 are the same as those shown in Tables 1 and 2. The second waveguide PBS 1040 is operable to recombine TEin and TMin to form a recombined input light beam, and transmit the recombined input light beam at the second port thereof. According to an embodiment, the polarization-separating apparatus 1000 further comprises a receiver 1090 optically coupled to the second port of the second waveguide PBS 1040 and operable to receive the recombined input light beam.

The second waveguide PBS 1040 is further operable to receive an output light beam at the first port thereof, and transmit the TE polarization component (referred herein as TEout) and the TM polarization component (referred herein as TMout) of the output light beam at the third port and the fourth port thereof, respectively. The polarization of TEout, which propagates up-stream, is rotated by about 0 degrees after passing through the first FR 1030 and the first PR 1020. Similarly, the polarization of TMout, which propagates up-stream, is rotated by about 0 degrees after passing through the second FR 1032 and the second PR 1022. The first waveguide PBS 1010 is operable to recombine TEout and TMout, and transmit the recombined output light beam at the third port thereof. According to an embodiment, the polarization-separating apparatus 1010 further comprises a laser operable to provide the output light beam.

According to an embodiment, the various components of the polarization-separating apparatus 1000, including the first waveguide PBS 1010, the second waveguide PBS 1040, the first PR 1020, the second PR 1022, the first FR 1030, and the second FR 1032 are integrated on a substrate. The substrate may comprise a silicon substrate, an SOI substrate, or the like.

Figure 10B:
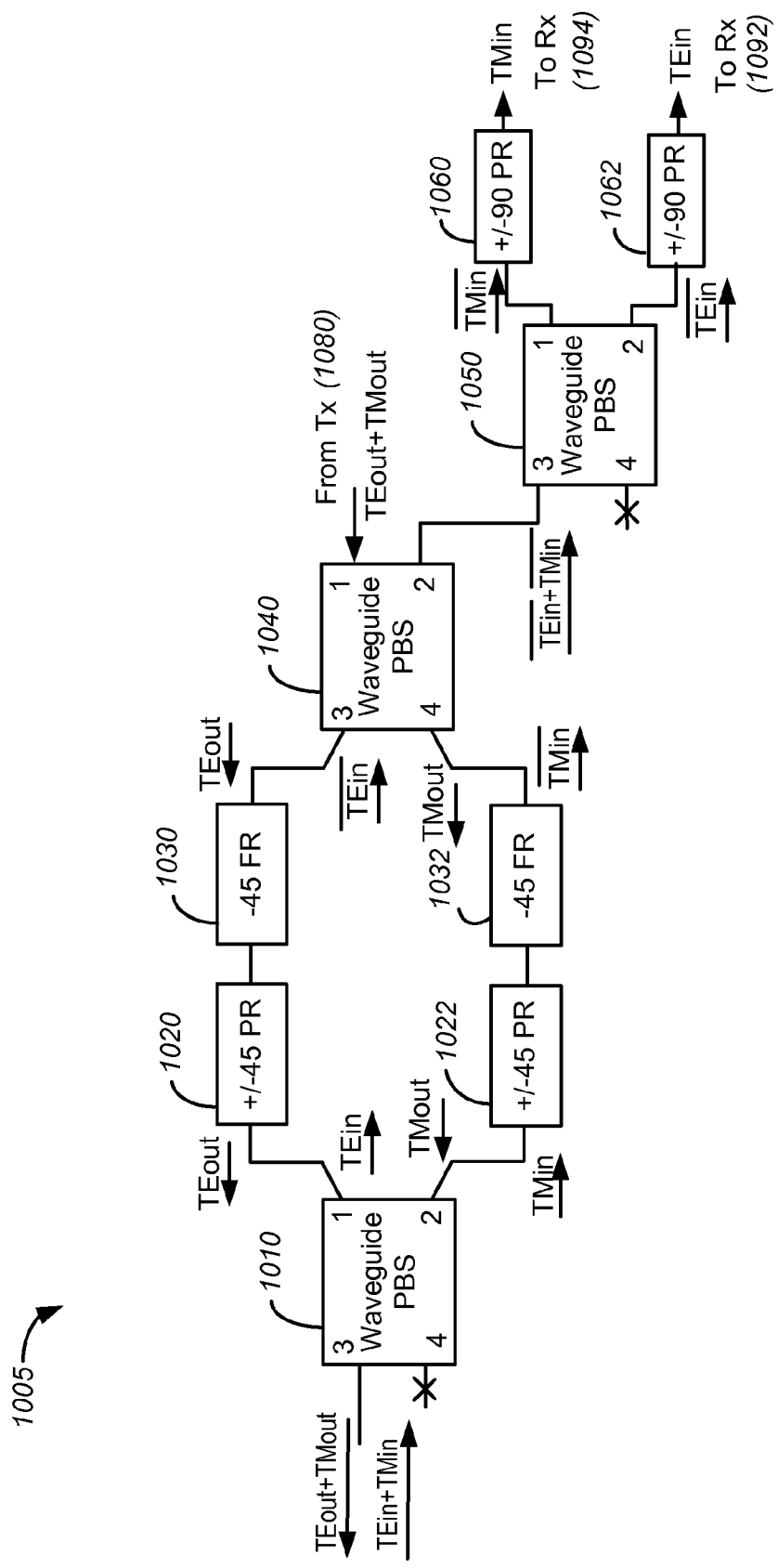

According to another embodiment as illustrated in FIG. 10B, a polarization-separating apparatus 1005 includes elements utilized in polarization-separating apparatus 1000 and additionally includes a third waveguide PBS 1050 having four ports. A third port is optically coupled to the second port of the second waveguide PBS 1040. The port mappings for the third waveguide PBS 1050 are the same as those shown in Tables 1 and 2. The third waveguide PBS 1050 is operable to separate the recombined input light beam into TEin and TMin, and transmit TEin and TMin at the first port and second port thereof, respectively.

The polarization-separating apparatus 1005 shares common components with the polarization-separating apparatus 1000 illustrated in FIG. 10A, and discussions related to FIG. 10A may be applicable to FIG. 10B as appropriate.

According to an embodiment, the polarization-separating apparatus 1005 further comprises a third PR 1060 optically coupled to the first port of the third waveguide PBS 1050, and a fourth PR 1062 optically coupled to the second port of the third waveguide PBS 1050. According to an embodiment, each of the third PR 1060 and the fourth PR 1062 comprises a 90-degree PR operable to rotate the polarization of a light beam by about 90 degrees. Therefore, the polarizations of TEin and TMin are rotated back to their original direction after passing through the third PR 1060 and the fourth PR 1062, respectively. According to an embodiment, the polarization-separating apparatus 1005 further comprises a first receiver 1092 optically coupled to the fourth PR 1062 and a second receiver 1094 optically coupled to the third PR 1060. The first receiver 1092 and the second receiver 1094 are operable to receive TEin and TMin, respectively.

Figure 10C:
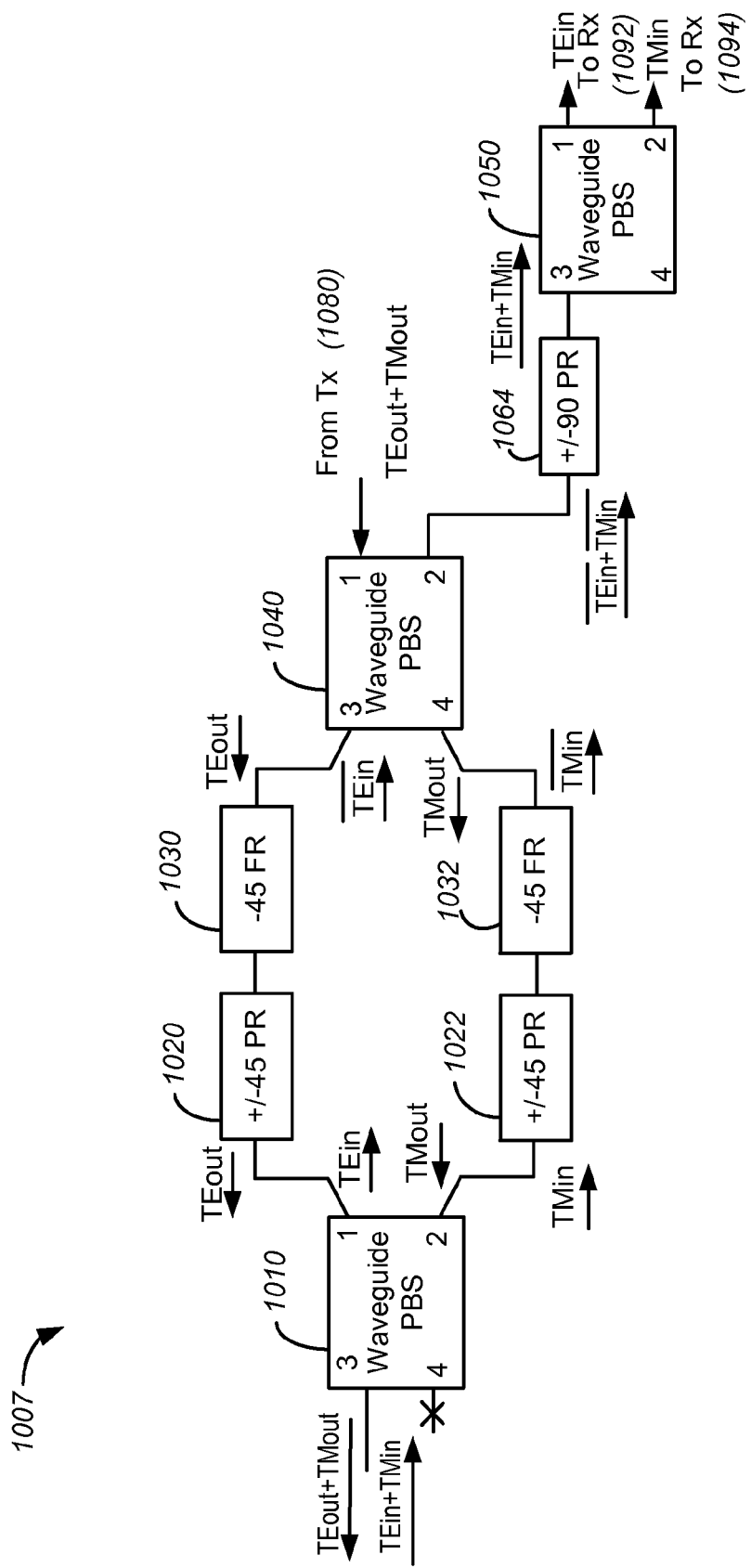

FIG. 10C illustrates a polarization-separating apparatus 1007 according to a specific embodiment of the invention. The polarization-separating apparatus 1007 shares common components with the polarization-separating apparatus 1000 illustrated in FIG. 10A, and discussions related to FIG. 10A may be applicable to FIG. 10C as appropriate. Instead of having the third PR 1060 and the fourth PR 1062 after the third waveguide PBS 1050 as illustrated in FIG. 10B, the polarization-separating apparatus 1007 comprises a fifth PR 1064 optically coupled to the second port of the second waveguide PBS 1040 and the third port of the third waveguide PBS 1050. According to an embodiment, the fifth PR 1094 comprises a 90-degree PR operable to rotate the polarization of a light beam by about 90 degrees. Accordingly, The first receiver 1092 and the second receiver 1094 are optically coupled to the first port and the second port of the third waveguide PBS 1050, respectively.

Figure 11:
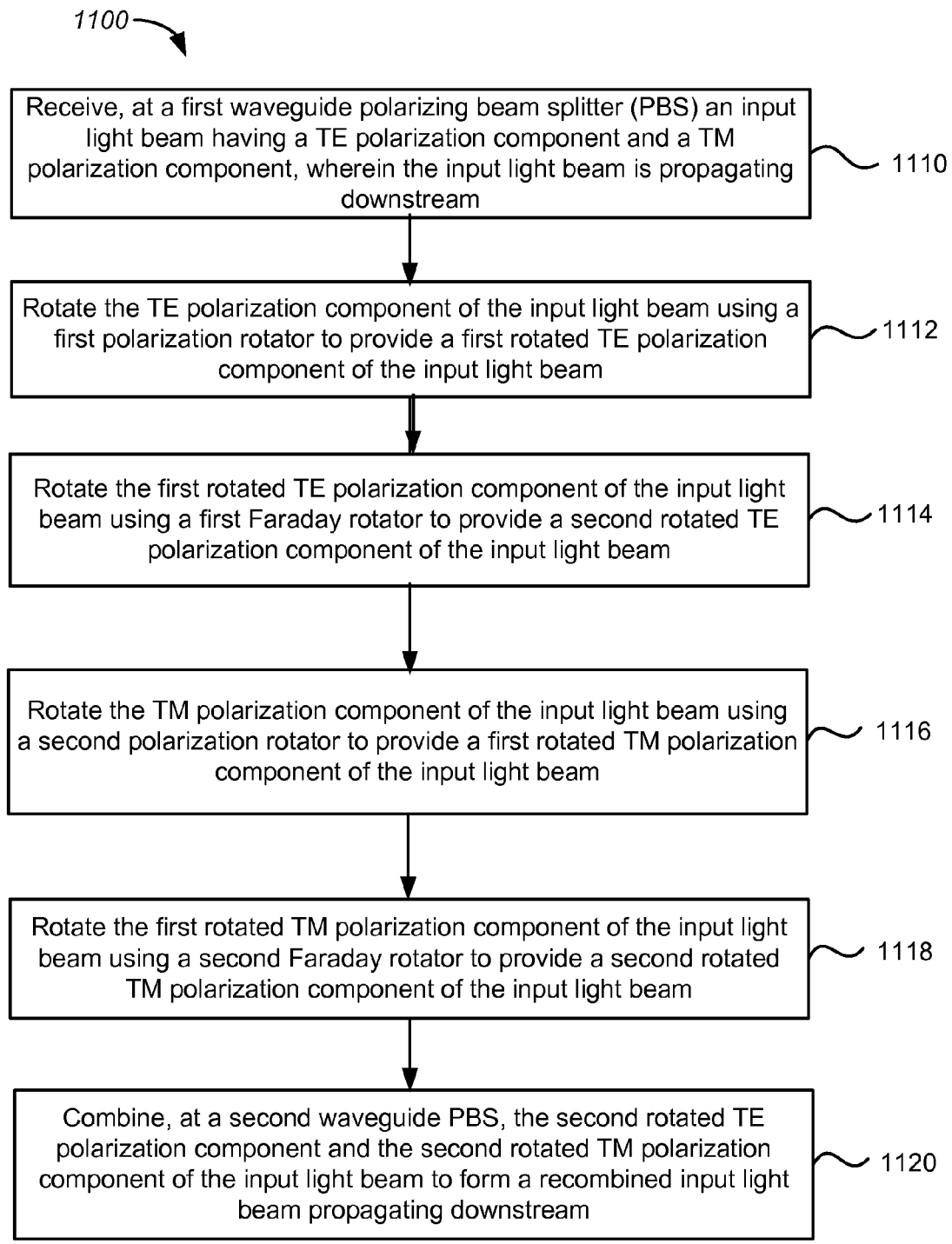
FIG. 11 is a simplified flowchart illustrating a method of operating a polarization-separating apparatus according to an embodiment of the invention.

FIG. 11 is a simplified flowchart illustrating a method 1100 of operating a polarization-separating apparatus according to an embodiment of the invention. The method 1100 comprises receiving, at a first waveguide polarizing beam splitter (PBS) an input light beam having a TE polarization component and a TM polarization component, wherein the input light beam is propagating downstream (1110). The method 1100 further comprises rotating the TE polarization component of the input light beam using a first polarization rotator to provide a first rotated TE polarization component of the input light beam (1112), and rotating the first rotated TE polarization component of the input light beam using a first Faraday rotator to provide a second rotated TE polarization component of the input light beam (1114). The method 1100 further comprises rotating the TM polarization component of the input light beam using a second polarization rotator to provide a first rotated TM polarization component of the input light beam (1116), and rotating the first rotated TM polarization component of the input light beam using a second Faraday rotator to provide a second rotated TM polarization component of the input light beam (1118). The method 1100 further comprises combining, at a second waveguide PBS, the second rotated TE polarization component and the second rotated TM polarization component of the input light beam to form a recombined input light beam propagating downstream (1120).

According to an embodiment, the method 1100 further comprises receiving, at the second waveguide PBS, an output light beam having a TE polarization component and a TM polarization component, wherein the output light beam is propagating upstream. The method 1100 further comprises rotating the TE polarization component of the output light beam using the first Faraday rotator to provide a first rotated TE polarization component of the output light beam, and rotating the first rotated TE polarization component of the output light beam using the first polarization rotator to provide a second rotated TE polarization component of the output light beam. The method 1100 further comprises rotating the TM polarization component of the output light beam using the second Faraday rotator to provide a first rotated TM polarization component of the output light beam, and rotating the first rotated TM polarization component of the output light beam using the second polarization rotator to provide a second rotated TM polarization component of the output light beam. The method 1100 further comprises combining, at the first waveguide PBS, the second rotated TE polarization component and the second rotated TM polarization component of the output light beam to form a recombined output light beam propagating upstream.

Figure 12:
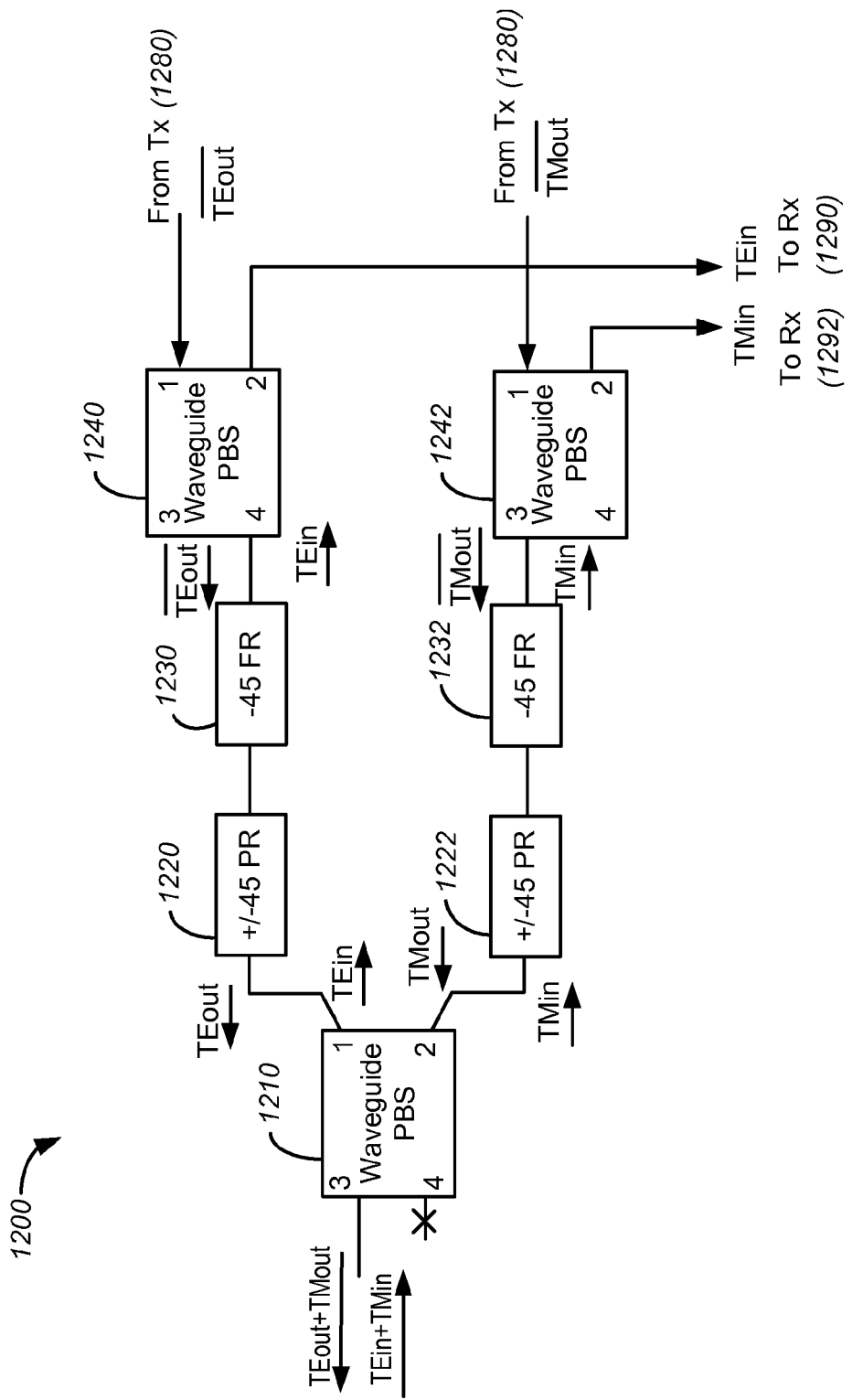
FIG. 12 is a simplified block diagram illustrating an integrated polarization-separating apparatus according to an embodiment of the invention.

FIG. 12 is a simplified block diagram illustrating an integrated polarization-separating apparatus 1200 according to another specific embodiment of the invention. The polarization-separating apparatus 1200 shares common components with the polarization-separating apparatus 1000 illustrated in FIG. 10A, and discussions related to FIG. 10A may be applicable to FIG. 12 as appropriate. The polarization-separating apparatus 1200 comprises a first waveguide PBS 1210 having four ports. The first waveguide PBS 1210 is configured similarly as the first waveguide 1010 illustrated in FIG. 10A in an embodiment, and discussion provided in relation to FIG. 10A may be applicable here.

The polarization-separating apparatus 1200 further comprises a first PR 1220 optically coupled to a first port of the first waveguide PBS 1210, a first FR 1230 optically coupled to the first PR 1220, a second PR 1222 optically coupled to a second port of the first waveguide PBS 1210, and a second FR 1232 optically coupled to the second PR 1222. According to an embodiment, each of the first PR 1220 and the second PR 1222 comprises a 45-degree PR, and each of the first FR 1230 and the second FR 1232 comprises a negative 45-degree FR. The combination of the first PR 1220 and the first FR 1230 is operable to rotate the polarization of a light beam propagating down-stream by about 0 degrees, and rotate the polarization of a light beam propagating up-stream by about 90 degrees. Therefore, the polarization of TEin, which propagates downstream, is rotated by about 0 degrees after passing through the first PR 1220 and the first FR 1230. Similarly, the combination of the second PR 1222 and the second FR 1232 are operable to rotate the polarization of a light beam propagating down-stream by about 0 degrees, and rotate the polarization of a light beam propagating up-stream by about 90 degrees.

The polarization-separating apparatus 1200 further comprises a second waveguide PBS 1240 and a third waveguide PBS 1242. A fourth port of the second waveguide PBS 1240 is optically coupled to the first FR 1230. A third port of the third waveguide PBS 1242 is optically coupled to the second FR 1232. The second waveguide PBS 1240 and the third waveguide PBS 1242 are operable to transmit TEin and TMin at a second port thereof, respectively. According to an embodiment, the polarization-separating apparatus 1200 further comprises a first receiver 1290 optically coupled to the second port of the third waveguide PBS 1240, and a second receiver 1292 optically coupled to the second port of the third waveguide PBS 1242. The first receiver 1290 and the second receiver 1292 are operable to receive TEin and TMin, respectively.

According to an embodiment, the various components of the polarization-separating apparatus 1200, including the first waveguide PBS 1210, the second waveguide PBS 1240, the third waveguide PBS 1242, the first PR 1220, the second PR 1222, the first FR 1230, and the second FR 1232 are integrated on a substrate. The substrate may comprise a silicon substrate, an SOI substrate, or the like.

According to an embodiment, the second waveguide PBS 1240 is operable to receive a 90-degree-rotated TE polarization component of an output light beam (denoted by TEout with a bar at the top in FIG. 12) at a first port thereof, and transmit the rotated TEout at the fourth port thereof. The third waveguide PBS 1242 is operable to receive a 90-degree-rotated TM polarization component of the output light beam (denoted by TMout with a bar at the top in FIG. 12) at a first port thereof, and transmit the rotated TMout at the third port thereof. The polarization of TEout, which propagates upstream, is rotated by about 90 degrees after passing through the first FR 1230 and the first PR 1220. Similarly, the polarization of TMout, which propagates up-stream, is rotated by about 90 degrees after passing through the second FR 1232 and the second PR 1222. The first waveguide PBS 1210 is operable to recombine TEout and TMout, and transmit the recombined output light beam at the third port thereof.

Figure 13:
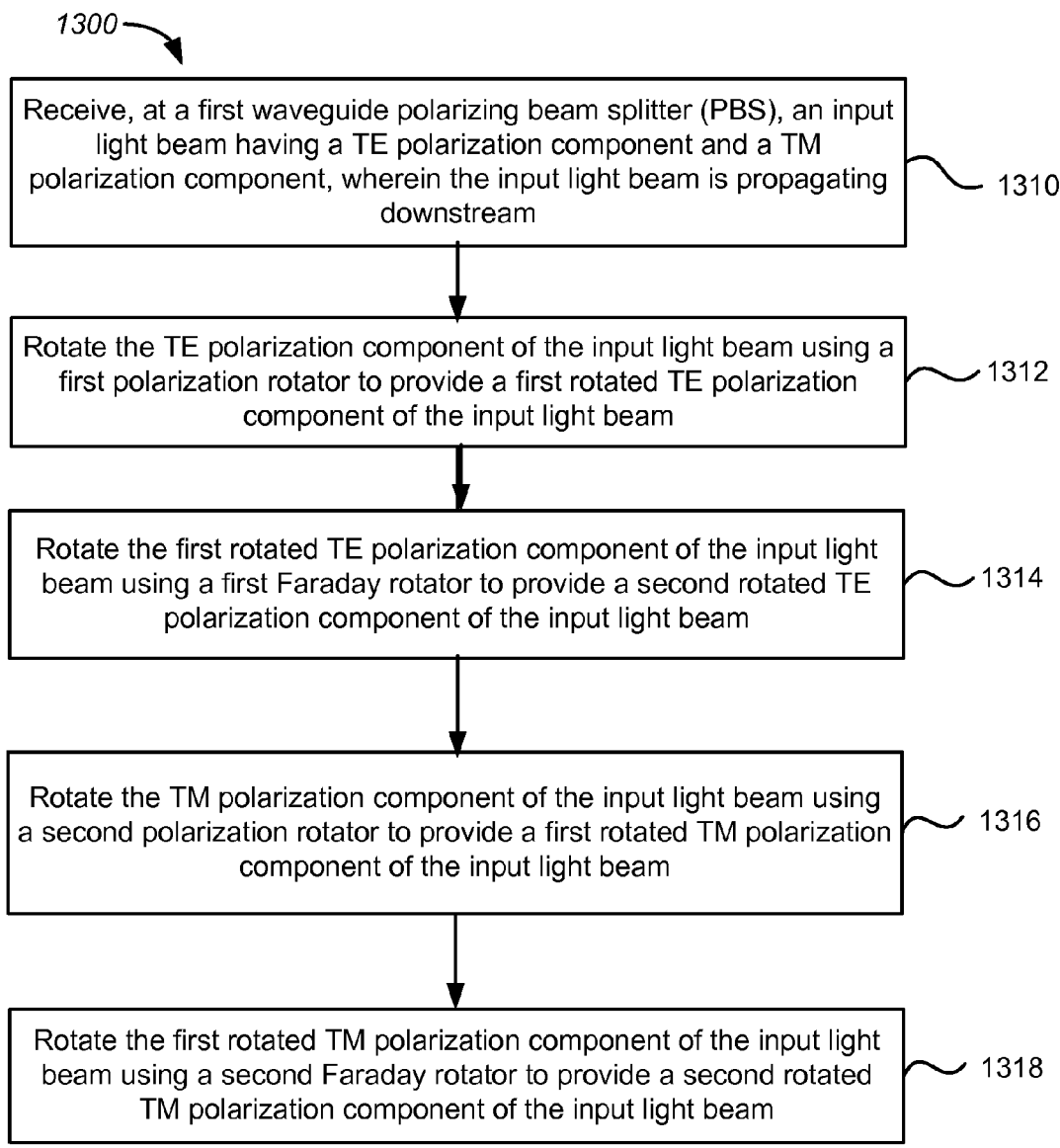
FIG. 13 is a simplified flowchart illustrating a method of operating a polarization-separating apparatus according to an embodiment of the invention.

FIG. 13 is a simplified flowchart illustrating a method 1300 of operating a polarization-separating apparatus according to another embodiment of the invention. The method 1300 comprises receiving, at a first waveguide polarizing beam splitter (PBS), an input light beam having a TE polarization component and a TM polarization component, wherein the input light beam is propagating downstream (1310). The method 1300 further comprises rotating the TE polarization component of the input light beam using a first polarization rotator to provide a first rotated TE polarization component of the input light beam (1312), and rotating the first rotated TE polarization component of the input light beam using a first Faraday rotator to provide a second rotated TE polarization component of the input light beam (1314). The method 1300 further comprises rotating the TM polarization component of the input light beam using a second polarization rotator to provide a first rotated TM polarization component of the input light beam (1316) and rotating the first rotated TM polarization component of the input light beam using a second Faraday rotator to provide a second rotated TM polarization component of the input light beam (1318).

According to an embodiment, the method 1300 further comprises transmitting the second rotated TE polarization component of the input light beam at a second waveguide PBS, and transmitting the second rotated TM polarization component of the input light beam at a third waveguide PBS.

According to an embodiment, the method 1300 further comprises receiving, at the second waveguide PBS, a TE polarization component of an output light beam, wherein the output light beam is propagating upstream, and receiving, at the third waveguide PBS, a TM polarization component of the output light beam. The method 1300 further comprises rotating the TE polarization component of the output light beam using the first Faraday rotator to provide a first rotated TE polarization component of the output light beam, and rotating the first rotated TE polarization component of the output light beam using the first polarization rotator to provide a second rotated TE polarization component of the output light beam. The method 1400 further comprises rotating the TM polarization component of the output light beam using the second Faraday rotator to provide a first rotated TM polarization component of the output light beam, and rotating the first rotated TM polarization component of the output light beam using the second polarization rotator to provide a second rotated TM polarization component of the output light beam. The method 1300 further comprises combining, at the first waveguide PBS, the second rotated TE polarization component and the second rotated TM polarization component of the output light beam to form a recombined output light beam propagating upstream.

Figure 14:
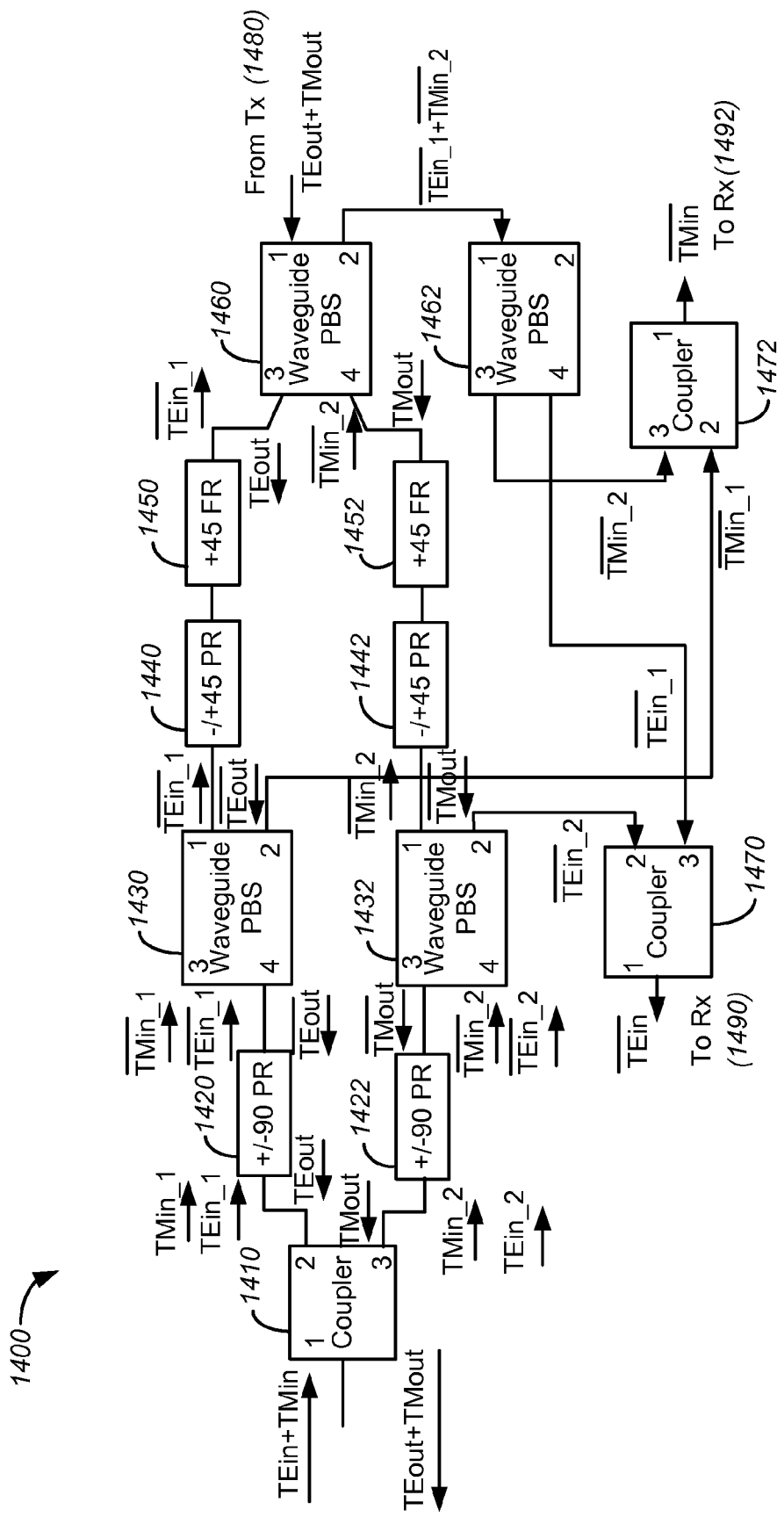
FIG. 14 is a simplified block diagram illustrating an integrated polarization-separating apparatus according to another embodiment of the invention.

FIG. 14 is a simplified block diagram illustrating an integrated polarization-separating apparatus 1400 according to an additional embodiment of the invention. The polarization-separating apparatus 1400 shares common components with the polarization-separating apparatus 1000 illustrated in FIG.

10A, and discussions related to FIG. 10A may be applicable to FIG. 14 as appropriate. The polarization-separating apparatus 1400 comprises an optical coupler 1410 having three ports. The optical coupler 1410 is operable to receive an input light beam at a first thereof, and transmit a first portion and a second portion of the input light beam at a second port and a third port thereof, respectively. According to an embodiment, the optical coupler 1410 comprises a 3 dB optical coupler. The polarization-separating apparatus 1400 further comprises a first 90-degree-PR 1420 optically coupled to a second port of the optical coupler 1410, and a second 90-degree-PR 1422 optically coupled to a third port of the optical coupler 1410.

The polarization-separating apparatus 1400 further comprises a first waveguide PBS 1430 and a second waveguide PBS 1432. A fourth port of the first waveguide PBS 1430 is optically coupled to the first 90-degree-PR 1420. A third port of the second waveguide PBS 1432 is optically coupled to the second 90-degree-PR 1422. The first waveguide PBS 1430 is operable to transmit the TE polarization component and the TM polarization component of the first portion of the input light beam (denoted by TEin_1 and TMin_1, respectively) at a first port and a second port thereof, respectively. The second waveguide PBS 1432 is operable to transmit the TE polarization component and the TM polarization component of the second portion of the input light beam (denoted by TEin_2 and TMin_2, respectively) at a second port and a first port thereof, respectively.

The polarization-separating apparatus 1400 further comprises a first 45-degree-PR 1440 optically coupled to the first port of the first waveguide PBS 1430, a first positive-45-degree-FR 1450 optically coupled to the first 45-degree-PR 1440, a second 45-degree-PR 1442 optically coupled to the first port of the second waveguide PBS 1432, and a second positive-45-degree-FR 1452 optically coupled to the second 45-degree-PR 1442. The discussions about the first PR 1220, the first FR 1230, the second PR 1222, and the second FR 1232 in relation to FIG. 12 are applicable to the first 45-degree-PR 1440, the first positive-45-degree-FR 1450, the second 45-degree-PR 1442, and the second positive-45-degree-FR 1452, and therefore are not repeated here. The polarization-separating apparatus 1400 further comprises a third waveguide PBS 1460. A third port of the third waveguide PBS 1460 is optically coupled to the first positive-45-degree-FR 1450. A fourth port of the third waveguide PBS 1460 is optically coupled to the second positive-45-degree-FR 1452. The third waveguide PBS 1460 is operable to combine TEin_1 and TMin_2 to form an intermediate input beam, and transmit the intermediate input beam at a second port thereof.

The polarization-separating apparatus 1400 further comprises a fourth waveguide PBS 1462. A first port of the fourth waveguide PBS 1462 is optically coupled to the second port of the third waveguide PBS 1460. The fourth waveguide PBS 1462 is operable to separate the intermediate input beam into TEin_1 and TMin_2, and transmit the re-separated TEin_1 and TMin_2 at a fourth port and a third port thereof, respectively.

The polarization-separating apparatus 1400 further comprises a first MMI 1470 having three ports. A second port of the first MMI 1470 is optically coupled to the second port of the second waveguide PBS 1432. A third port of the first MMI 1470 is optically coupled to the fourth port of the fourth waveguide PBS 1462. The first MMI 1470 is operable to combine TEin_1 and TEin_2 to form a combined TEin, and transmit the combined TEin at a first port thereof. The polarization-separating apparatus 1400 further comprises a second MMI 1472 having three ports. A second port of the second MMI 1472 is optically coupled to the second port of the first waveguide PBS 1430. A third port of the second MMI 1472 is optically coupled to the third port of the fourth waveguide PBS 1462. The second MMI 1472 is operable to combine TMin_1 and TMin_2 to form a combined TMin, and transmit the combined TMin at a first port thereof. According to an embodiment, the polarization-separating apparatus 1400 further comprises a first receiver 1490 optically coupled to the first port of the first MMI 1470, and a second receiver 1492 optically coupled to the first port of the second MMI 1472. The first receiver 1490 and the second receiver 1492 are operable to receive TEin and TMin, respectively.

According to an embodiment, the third waveguide PBS 1460 is also operable to receive an output light beam at a first port thereof, and transmit the TE polarization component and the TM polarization component of the output light beam (referred herein as TEout and TMout, respectively) at the third port and the fourth port, respectively. TEout, which propagates up-stream, is rotated by about 90 degrees after passing through the first positive-45-degree-FR 1450 and the first 45-degree-PR 1440. TEout is then transmitted by the first waveguide PBS 1430 at the fourth port thereof, and rotated by about 90 degrees after passing through the first 90-degree-PR 1420. TMout, which propagates up-stream, is rotated by about 90 degrees after passing through the second positive-45-degree-FR 1452 and the second 45-degree-PR 1442. TMout is then transmitted by the second waveguide PBS 1432 at the third port thereof, and rotated by about 90 degrees after passing through the second 90-degree-PR 1422. The optical coupler 1410 recombines TEout and TMout, and transmit the recombined output light beam at the first port thereof. According to an embodiment, the polarization-separating apparatus 1500 further comprises a laser operable to provide the output light beam.

According to an embodiment, the various components of the polarization-separating apparatus 1400 are integrated on a substrate. The substrate may comprise a silicon substrate, an SOI substrate, or the like.

According to an embodiment, a method of operating a polarization-separating apparatus comprises receiving an input light beam propagating downstream, and separating, using an optical coupler, the input light beam into a first portion of the input light beam and a second portion of the input light beam. The method further comprises rotating the first portion of the input light beam using a first polarization rotator to provide a rotated first portion of the input light beam, and rotating the second portion of the input light beam using a second polarization rotator to provide a rotated second portion of the input light beam.

According to an embodiment, the method further comprises separating, using a first waveguide PBS, the rotated first portion of the input light beam into a TE polarization component and a TM polarization component, rotating the TE polarization component of the first portion of the input light beam using a third polarization rotator to provide a first rotated TE polarization component of the first portion of the input light beam, and rotating the first rotated TE polarization component of the first portion of the input light beam using a first Faraday rotator to provide a second rotated TE polarization component of the first portion of the input light beam. The method further comprises separating, using a second waveguide PBS, the rotated second portion of the input light beam into a TE polarization component and a TM polarization component, rotating the TM polarization component of the second portion of the input light beam using a fourth polarization rotator to provide a first rotated TM polarization component of the second portion of the input light beam, and rotating the first rotated TM polarization component of the second portion of the input light beam using a second Faraday rotator to provide a second rotated TM polarization component of the second portion of the input light beam. The method further comprises combining, using a third waveguide PBS, the second rotated TE polarization component of the first portion of the input light beam and the second rotated TM polarization component of the second portion of the input light beam to form an intermediate input light beam.

According to an embodiment, the method further comprises receiving, at the third waveguide PBS, an output light beam having a TE polarization component and a TM polarization component, wherein the output light beam is propagating upstream, and separating, using the third waveguide PBS, the output light beam into the TE polarization component and the TM polarization component. The method further comprises rotating the TE polarization component of the output light beam using the first Faraday rotator to provide a first rotated TE polarization component of the output light beam, and rotating the first rotated TE polarization component of the output light beam using the first polarization rotator to provide a second rotated TE polarization component of the output light beam. The method further comprises rotating the TM polarization component of the output light beam using the second Faraday rotator to provide a first rotated TM polarization component of the output light beam, and rotating the first rotated TM polarization component of the output light beam using the second polarization rotator to provide a second rotated TM polarization component of the output light beam.

According to an embodiment, the method further comprises transmitting, at the first waveguide PBS, the second rotated TE polarization component of the output light beam, and transmitting, at the second waveguide PBS, the second rotated TM polarization component of the output light beam. The method further comprises rotating the TE polarization component of the output light beam transmitted by the first waveguide PBS using the first polarization rotator to provide a third rotated TE polarization component of the output light beam, and rotating the TM polarization component of the output light beam transmitted by the second waveguide PBS using the first polarization rotator to provide a third rotated TM polarization component of the output light beam. The method further comprises combining the third rotated TE polarization component and the third rotated TM polarization component of the output light beam using the optical coupler.

According to an embodiment, the method further comprises separating, using a fourth waveguide PBS, the intermediate input light beam into the second rotated TE polarization component of the first portion of the input light beam and the second rotated TM polarization component of the second portion of the input light beam, combining, using a first MMI coupler, the TE polarization component of the first portion of the input light beam and TE polarization component of the second portion of the input light beam, and combining, using a second MMI coupler, the TM polarization component of the first portion of the input light beam and TM polarization component of the second portion of the input light beam.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An integrated photonic polarization-separating apparatus comprising:
    a first waveguide polarization beam splitter (PBS) having a first port, a second port, a third port, and a fourth port;
    a first polarization rotator optically coupled to the first port of the first waveguide PBS;
    a waveguide comprising silicon;
    a first Faraday rotator optically coupled to the first polarization rotator using the waveguide comprising silicon;
    a second polarization rotator optically coupled to the second port of the first waveguide PBS;
    a second Faraday rotator optically coupled to the second polarization rotator;
    a second waveguide PBS having a first port, a second port, a third port, and a fourth port, wherein the third port is optically coupled to the first Faraday rotator and the fourth port is optically coupled to the second Faraday rotator; and
    wherein the first waveguide PBS, the first polarization rotator, the first Faraday rotator, the second polarization rotator, the second Faraday rotator, and the second waveguide PBS are integrated on a semiconductor substrate.

2. The integrated photonic polarization-separating apparatus of claim 1 wherein each of the first polarization rotator and the second polarization rotator comprises a 45-degree polarization rotator.

3. The integrated photonic polarization-separating apparatus of claim 2 wherein each of the first Faraday rotator and the second Faraday rotator comprises a negative 45-degree Faraday rotator.

4. The integrated photonic polarization-separating apparatus of claim 1 further comprising a third waveguide PBS having a first port, a second port, a third port, and a fourth port, wherein the third port is optically coupled to the second port of the second waveguide PBS.

5. The integrated photonic polarization-separating apparatus of claim 4 further comprising:
    a third polarization rotator optically coupled to the first port of the third waveguide PBS, and
    a fourth polarization rotator optically coupled to the second port of the third waveguide PBS.

6. The integrated photonic polarization-separating apparatus of claim 5 wherein each of the third polarization rotator and the fourth polarization rotator comprises a 90-degree polarization rotator.

7. The integrated photonic polarization-separating apparatus of claim 1 further comprising:
    a third polarization rotator optically coupled to the second port of the second waveguide PBS; and
    a third waveguide PBS having a first port, a second port, a third port, and a fourth port, wherein the third port is optically coupled to the third polarization rotator.

8. The integrated photonic polarization-separating apparatus of claim 7 wherein the third polarization rotator comprises a 90-degree polarization rotator.

9. The integrated photonic polarization-separating apparatus of claim 7 further comprising:
    a first receiver optically coupled to the first port of the third waveguide PBS; and
    a second receiver optically coupled to the second port of the third waveguide PBS.

10. The integrated photonic polarization-separating apparatus of claim 1 further comprising a laser optically coupled to the first port of the second waveguide PBS.

11. The integrated photonic polarization-separating apparatus of claim 1 wherein the semiconductor substrate is a silicon-on-insulator (SOI) substrate.

12. The integrated photonic polarization-separating apparatus of claim 1, wherein:
the semiconductor substrate comprises a handle portion;
the handle portion comprises silicon;
the semiconductor substrate comprise an insulation layer next to the handle portion;
the insulation layer comprises an oxide material; and
the waveguide comprising silicon is next to the insulation layer.

\* \* \* \* \*